United States Patent
Mizusaki et al.

(10) Patent No.: US 8,597,739 B2
(45) Date of Patent: Dec. 3, 2013

(54) ORIENTATION FILM, LIQUID CRYSTAL DISPLAY HAVING ORIENTATION FILM, AND METHOD FOR FORMING ORIENTATION FILM

(75) Inventors: Masanobu Mizusaki, Osaka (JP); Yohei Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 81 days.

(21) Appl. No.: 13/131,680

(22) PCT Filed: Jun. 26, 2009

(86) PCT No.: PCT/JP2009/002962
§ 371 (c)(1),
(2), (4) Date: May 27, 2011

(87) PCT Pub. No.: WO2010/061491
PCT Pub. Date: Jun. 3, 2010

(65) Prior Publication Data
US 2011/0234955 A1    Sep. 29, 2011

(30) Foreign Application Priority Data
Nov. 27, 2008  (JP) .................................. 2008-303231

(51) Int. Cl.
*G02F 1/1337*    (2006.01)
(52) U.S. Cl.
USPC ........................... 428/1.26; 349/125; 349/130
(58) Field of Classification Search
USPC .................. 428/1.2, 1.25–1.26; 349/123–135
See application file for complete search history.

(56) References Cited

U.S. PATENT DOCUMENTS

| | | | |
|---|---|---|---|
| 5,786,041 A | 7/1998 | Takenaka et al. | |
| 5,976,640 A | 11/1999 | Yu et al. | |
| 8,345,201 B2 | 1/2013 | Mizusaki et al. | |
| 2002/0047971 A1 | 4/2002 | Kwon et al. | |
| 2002/0080320 A1* | 6/2002 | Suzuki et al. | 349/153 |
| 2002/0120090 A1 | 8/2002 | Cheng et al. | |
| 2003/0039768 A1 | 2/2003 | Buchecker et al. | |

(Continued)

FOREIGN PATENT DOCUMENTS

| | | |
|---|---|---|
| CN | 101004495 A | 7/2007 |
| EP | 1 498 468 A1 | 1/2005 |

(Continued)

OTHER PUBLICATIONS

JPO Website Machine English Translation of JP 2008-076950, Nakamura et al., Apr. 3, 2008.*

(Continued)

*Primary Examiner* — Sophie Hon
(74) *Attorney, Agent, or Firm* — Nixon & Vanderhye, P.C.

(57) ABSTRACT

An alignment film (100) according to the present invention includes: a first alignment layer (102) containing a first polyimide (p1); and a second alignment layer (104) containing a polymerization product (po) resulting from polymerization of a polyfunctional monomer and a second polyimide (p2). The polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

25 Claims, 7 Drawing Sheets

(56) References Cited

U.S. PATENT DOCUMENTS

| | | |
|---|---|---|
| 2003/0043336 A1 | 3/2003 | Sasaki et al. |
| 2003/0048401 A1 | 3/2003 | Hanaoka et al. |
| 2003/0086044 A1 | 5/2003 | Inoue et al. |
| 2003/0087045 A1 | 5/2003 | Nakata et al. |
| 2003/0232930 A1 | 12/2003 | Gibbons et al. |
| 2004/0048004 A1* | 3/2004 | Hosaka et al. .............. 428/1.26 |
| 2004/0138394 A1 | 7/2004 | Buchecker et al. |
| 2004/0158030 A1 | 8/2004 | Okada |
| 2004/0233377 A1* | 11/2004 | Utsumi et al. ................ 349/155 |
| 2004/0265742 A1 | 12/2004 | Marck et al. |
| 2005/0116200 A1 | 6/2005 | Nakanishi |
| 2006/0051524 A1 | 3/2006 | Gibbons et al. |
| 2007/0121045 A1 | 5/2007 | Kim et al. |
| 2008/0160222 A1* | 7/2008 | Harding et al. ............. 428/1.26 |
| 2008/0220339 A1* | 9/2008 | Zakrevskyy et al. ............. 430/2 |
| 2009/0040406 A1 | 2/2009 | Ong |
| 2009/0279032 A1* | 11/2009 | Kwok et al. .................. 349/124 |
| 2011/0102720 A1 | 5/2011 | Mizusaki et al. |
| 2011/0164213 A1 | 7/2011 | Nakanishi et al. |
| 2011/0199566 A1 | 8/2011 | Mazusaki et al. |
| 2011/0222005 A1 | 9/2011 | Mizusaki et al. |
| 2011/0234955 A1 | 9/2011 | Mizusaki et al. |
| 2012/0008079 A1 | 1/2012 | Mizusaki et al. |
| 2013/0148066 A1 | 6/2013 | Iwata et al. |

FOREIGN PATENT DOCUMENTS

| | | |
|---|---|---|
| JP | 03-055523 | 3/1991 |
| JP | 06-202118 | 7/1994 |
| JP | 08-334771 | 12/1996 |
| JP | 09-185066 | 7/1997 |
| JP | 10-039308 | 2/1998 |
| JP | 11-352486 | 12/1999 |
| JP | 2000-122066 | 4/2000 |
| JP | 2001-004986 | 1/2001 |
| JP | 2001-027759 | 1/2001 |
| JP | 2002-357830 | 12/2002 |
| JP | 2003-149647 | 5/2003 |
| JP | 3520376 | 2/2004 |
| JP | 2006-215184 | 8/2006 |
| JP | 2007-304509 | 11/2007 |
| JP | 2010-107536 | 5/2010 |
| WO | WO 2006/121220 A1 | 11/2006 |
| WO | 2010/047011 A1 | 4/2010 |

OTHER PUBLICATIONS

Kwak, J., et al., "*Observation of Hybrid Type Alignment Film in TFT-LCD*," Proceedings of 2007 Japanese Liquid Crystal Society Annual Meeting, Sep. 2007, PA03, p. 138.

Lee, Y., et al., "*Liquid Crystal Alignment Control Using Reactive Mesogen Mixed with Alignment Layers*," IDW'09, pp. 747-750, 2009.

English translation of the International Preliminary Report on Patentability mailed Jul. 14, 2011 in corresponding PCT Application No. PCT/ JP2009/002962.

International Search Report mailed Sep. 29, 2009 in PCT Application No. PCT/JP2009/002962.

International Search Report for PCT/JP2009/002934, mailed Sep. 29, 2009.

English translation of the International Preliminary Report on Patentability mailed Feb. 17, 2011 in PCT Application No. PCT/ JP2009/002934.

Final Office Action mailed Aug. 13, 2013 in U.S. Appl. No. 13/131,700.

Office Action mailed Apr. 4, 2013 in U.S. Appl. No. 13/131,700.

Supplementary European Search Report issued in EP Application No. 09 82 8740 dated Jun. 19, 2012.

English translation of the International Preliminary Report on Patentability mailed Jul. 14, 2011 in PCT Application No. PCT/JP2009/002931.

International Search Report mailed Sep. 29, 2009 in PCT Application No. PCT/JP2009/002931.

International Search Report for PCT/JP2009/004204, mailed Dec. 1, 2009.

International Preliminary Report on Patentability and Written Opinion issued in Application No. PCT/JP2009/004204 dated Apr. 21, 2011.

Office Action mailed Jan. 9, 2013 in U.S. Appl. No. 13/011,537.
Office Action mailed Apr. 18, 2013 in U.S. Appl. No. 13/001,537.
Office Action mailed Aug. 14, 2013 in U.S. Appl. No. 13/061,809.

\* cited by examiner

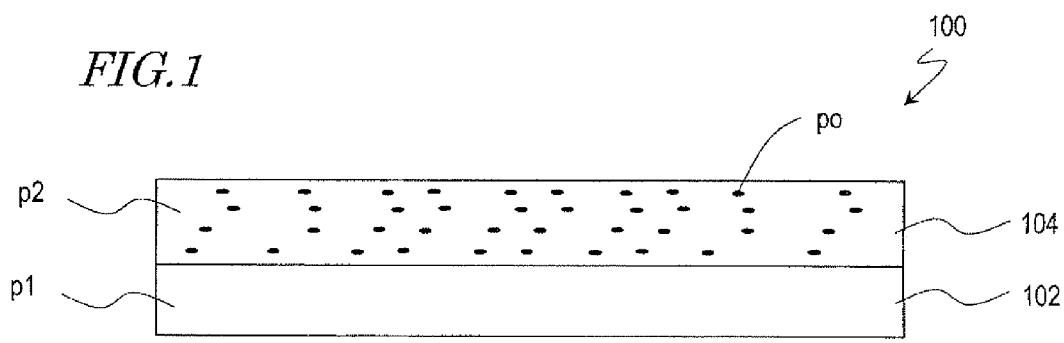
FIG.1
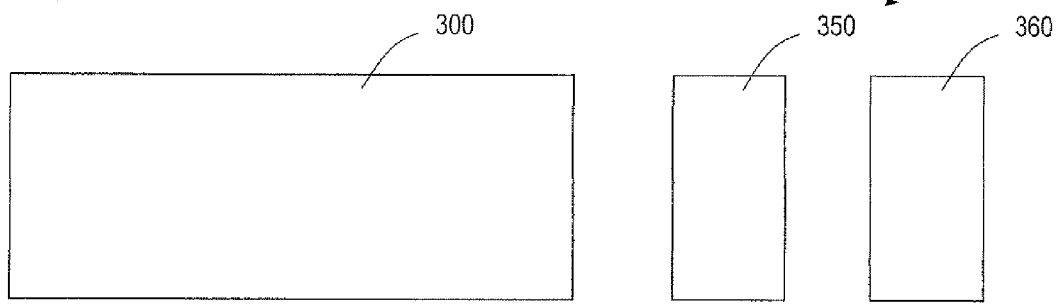
FIG.2
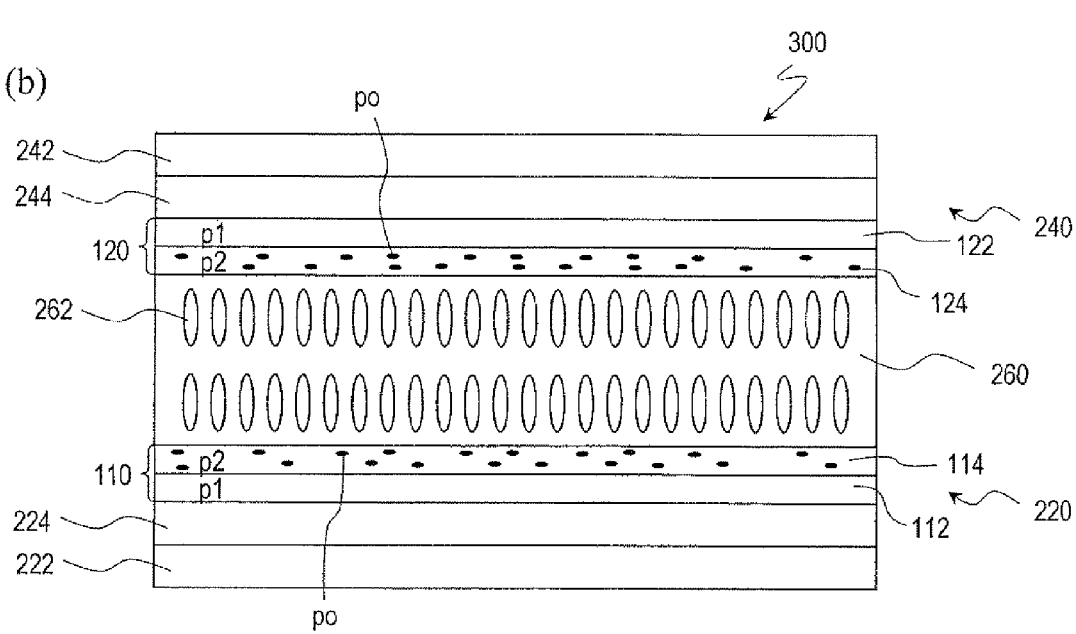

(a)

(b)

(c)

(a)

(b)

(c)

(d)

ORIENTATION FILM, LIQUID CRYSTAL DISPLAY HAVING ORIENTATION FILM, AND METHOD FOR FORMING ORIENTATION FILM

This application is the U.S. national phase of International Application No. PCT/JP2009/002962, filed 26 Jun. 2009, which designated the U.S. and claims priority to JP Application No. 2008303231, filed 27 Nov. 2008, the entire contents of each of which are hereby incorporated by reference.

TECHNICAL FIELD

The present invention relates to an alignment film and a liquid crystal display device having the alignment film, as well as a method of forming an alignment film.

BACKGROUND ART

Liquid crystal display devices are used not only as small-sized display devices, e.g., the display sections of mobile phones, but also as large-sized television sets. Liquid crystal display devices of the TN (Twisted Nematic) mode, which have often been used conventionally, have relatively narrow viewing angles. In recent years, however, liquid crystal display devices with wide viewing angles have been produced, e.g., the IPS (In-Plane Switching) mode and the VA (Vertical Alignment) mode. Among such modes with wide viewing angles, the VA mode is adopted in a large number of liquid crystal display devices because of an ability to realize a high contrast ratio.

A liquid crystal display device includes an alignment film which defines an alignment direction of liquid crystal molecules in its neighborhood. In a VA-mode liquid crystal display device, an alignment film causes liquid crystal molecules to be aligned substantially perpendicularly to its principal face. Generic alignment films are made of polyimide, which has advantages in terms of thermal resistance, solvent resistance, hygroscopicity, and so on.

As one kind of VA mode, the MVA (Multi-domain Vertical Alignment) mode is known, under which a plurality of liquid crystal domains are created in one pixel region. An MVA-mode liquid crystal display device includes alignment regulating structures provided on the liquid-crystal-layer side of at least one of a pair of opposing substrates, between which a vertical-alignment type liquid crystal layer is interposed. The alignment regulating structures may be linear slits (apertures) or ribs (protruding structures) that are provided on electrodes, for example. The alignment regulating structures provide alignment regulating forces from one side or both sides of the liquid crystal layer, thus creating a plurality of liquid crystal domains (typically four liquid crystal domains) with different alignment directions, whereby the viewing angle characteristics are improved.

As another kind of VA mode, the CPA (Continuous Pinwheel Alignment) mode is also known. In a generic liquid crystal display device of the CPA mode, pixel electrodes of a highly symmetrical shape are provided, and on a counter electrode, protrusions are provided corresponding to the centers of liquid crystal domains. These protrusions are also referred to as rivets. When a voltage is applied, in accordance with an oblique electric field which is created with the counter electrode and a highly symmetrical pixel electrode, liquid crystal molecules take an inclined alignment of a radial shape. Moreover, the inclined alignment of the liquid crystal molecules are stabilized due to the alignment regulating forces of side slopes of the rivets. Thus, the liquid crystal molecules in one pixel are aligned in a radial shape, thereby improving the viewing angle characteristics.

Unlike in TN-mode liquid crystal display devices in which the pretilt direction of liquid crystal molecules is defined by an alignment film, alignment regulating forces in an MVA-mode liquid crystal display device are applied to the liquid crystal molecules by linear slits or ribs. Therefore, depending on distances from the slits and ribs, the alignment regulating forces for the liquid crystal molecules within a pixel region will differ, thus resulting in differing response speeds of the liquid crystal molecules within the pixel. Similarly, also in the CPA mode, the response speeds of the liquid crystal molecules will differ within the pixel, and the differences in response speed will become more outstanding as the pixel electrodes increase in size. Furthermore, in a VA-mode liquid crystal display device, the light transmittance in the regions in which slits, ribs, or rivets are provided is low, thus making it difficult to realize a high luminance.

In order to avoid the above problems, use of an alignment film for applying alignment regulating forces to liquid crystal molecules in a VA-mode liquid crystal display device is also known, such that the liquid crystal molecules will tilt from the normal direction of a principal face of the alignment film in the absence of an applied voltage (see, for example, Patent Documents 1 and 2).

In the liquid crystal display device disclosed in Patent Document 1, the alignment film is subjected to an alignment treatment such as rubbing. The alignment film aligns the liquid crystal molecules so that the liquid crystal molecules will be aligned with a tilt from the normal direction of its principal face even in the absence of an applied voltage, whereby an improved response speed is realized. Furthermore, since the alignment film defines the pretilt azimuth of liquid crystal molecules so that the liquid crystal molecules within one pixel will be symmetrically aligned, the viewing angle characteristics are improved. In a liquid crystal display device disclosed in Patent Document 1, four liquid crystal domains are formed in a liquid crystal layer in accordance with a combination of two alignment regions of a first alignment film and two alignment regions of a second alignment film, whereby a wide viewing angle is realized.

An alignment film disclosed in Patent Document 2 is made of a photosensitive material having a photoreactive functional group, and by obliquely radiating light onto this alignment film, a pretilt is conferred so that the liquid crystal molecules will be inclined from the normal direction of a principal face of the alignment film in the absence of an applied voltage. An alignment film to which a pretilt is conferred through such a photo-alignment treatment may also be referred to as a photo-alignment film. In the photo-alignment film disclosed in Patent Document 2, fluctuations in the pretilt angle are controlled to 1° or less, by using an alignment film material which includes a bonded structure of photoreactive functional groups.

An alignment film which is made of one polymer may not attain adequate characteristics. Therefore, use of two different polymers to form an alignment film is under study (see Patent Document 3 and Non-Patent Document 1).

An alignment film disclosed in Patent Document 3 includes a main layer which is made of a first polymer having a large molecular weight and/or polarity, and a surface layer which is made of a second polymer having a small molecular weight and/or polarity. As the first polymer, a material including an aromatic (e.g., SE7690 manufactured by NISSAN CHEMICAL INDUSTRIES, LTD.), which hardly gives rise to any internal DC bias voltage, is used. On the other hand, the second polymer, which is a material that undergoes a large change in the pretilt angle in response to ultraviolet irradiation, is a cyclobutane-type polymer material. In Patent Document 3, SE7210 manufactured by NISSAN CHEMICAL INDUSTRIES, LTD. is used as the second polymer.

Non-Patent Document 1 discloses an alignment film including a lower layer whose main component is polyamic acid and an upper layer whose main component is polyimide. In Non-Patent Document 1, isolation into the two layers of the upper layer and the lower layer is achieved by appropriately setting a pre-bake temperature and time.

Citation List

Patent Literature

[Patent Document 1] Japanese Laid-Open Patent Publication No. 11-352486
[Patent Document 2] The pamphlet of International Publication No. 2006/121220
[Patent Document 3] Japanese Laid-Open Patent Publication No. 8-334771

Non-Patent Literature

[Non-Patent Document 1] Mu-Sun Kwak at al., "Observation of Hybrid Type Alignment Film in TFT-LCD", Proceedings of 2007 Japanese Liquid Crystal Society Annual meeting, September 2007, PA03, p 138

SUMMARY OF INVENTION

Technical Problem

Generally speaking, when a liquid crystal display device keeps displaying the same pattern for a long time, the previous pattern may remain even after the displayed image is changed. Such a phenomenon is also called image sticking. For example, after displaying white in a partial region of the screen and black in another region for a long time, if the entire liquid crystal panel is caused to display the same intermediate gray scale level, the region previously displaying white may appear slightly brighter than the region previously displaying black.

One cause of such image sticking is charge accumulation. The amount of charge accumulated in the region which was displaying black is different from the amount of charge accumulated in the region which was displaying white, and an electric field occurs because impurity ions in the liquid crystal accumulate at the interface between the alignment film and the liquid crystal layer. Therefore, when entirely switched to the same gray scale level, different voltages are applied across the layers of liquid crystal in the respective regions which were displaying white and black, thus being perceived as image sticking.

Note that image sticking caused by such charge accumulation can be somewhat suppressed by applying voltages of inverted polarities to the respective pixels. Therefore, an image sticking caused by charge accumulation is also called DC image sticking. The driving which involves applying voltages of inverted polarities for the sake of suppressing DC image sticking is also called polarity inversion driving. In actuality, even with polarity inversion driving, it is difficult to apply voltages of completely symmetric polarities and thus a resultant image sticking may be perceived as flickering.

Moreover, image sticking will also occur when minute changes in the pretilt angle occur. When the pretilt angle changes, the V-T characteristics are affected, and thus the transmittance will vary even if the same voltage is applied. Since the applied voltage when displaying white is different from the applied voltage when displaying black, the amount of change in the tilt angle will vary depending on the applied voltage. When later entirely switched to the same gray scale level, image sticking may be perceived due to changes in the tilt angle. Such image sticking cannot be suppressed even by performing polarity inversion driving, and is also called AC image sticking.

The present invention has been made in view of the above problems, and an objective thereof is to provide an alignment film which suppresses image sticking caused by changes in the pretilt angle and a liquid crystal display device having the alignment film, as well as a method of forming an alignment film.

Solution to Problem

An alignment film according to the present invention is an alignment film comprising: a first alignment layer containing a first polyimide; and a second alignment layer containing a second polyimide different from the first polyimide and a polymerization product resulting from polymerization of a polyfunctional monomer, wherein the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

In one embodiment, the polyfunctional monomer contains at least one monomer from among a dimethacrylate monomer, a diacrylate monomer, a dimethacrylamide monomer, and a diacrylamide monomer.

In one embodiment, in the polyfunctional monomer, P1 and P2 are acrylate groups; Z1 is a single bond; and n is 0 or 1.

In one embodiment, in the polyfunctional monomer, P1 and P2 are methacrylate groups; Z1 is a single bond; and n is 0 or 1.

In one embodiment, in the polyfunctional monomer, P1 and P2 are acrylamide groups; Z1 is a single bond; and n is 0 or 1.

In one embodiment, in the polyfunctional monomer, P1 and P2 are methacrylamide groups; Z1 is a single bond; and n is 0 or 1.

In one embodiment, a side chain of a precursor of the first polyimide does not have any vertical alignment groups.

In one embodiment, the first polyimide is represented by general formula (2x).

[Formula 1]

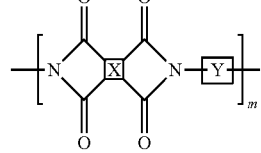

(2x)

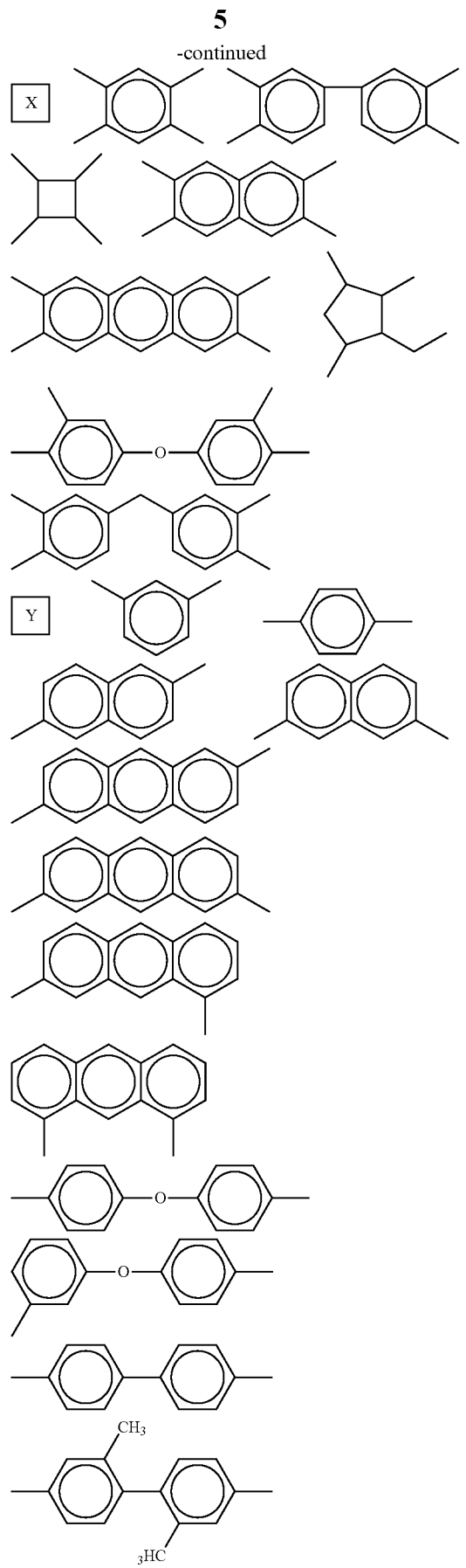
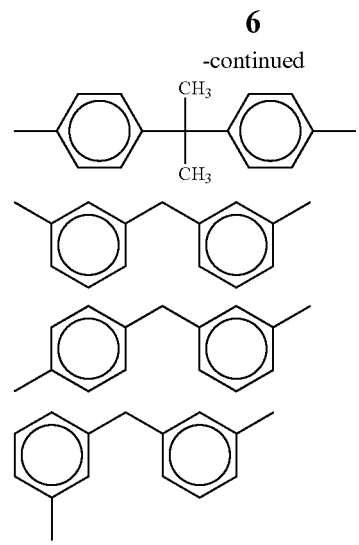
In one embodiment, a side chain of a precursor of the first polyimide has a vertical alignment group.
In one embodiment, the first polyimide is represented by general formula (2y),
[Formula 2]
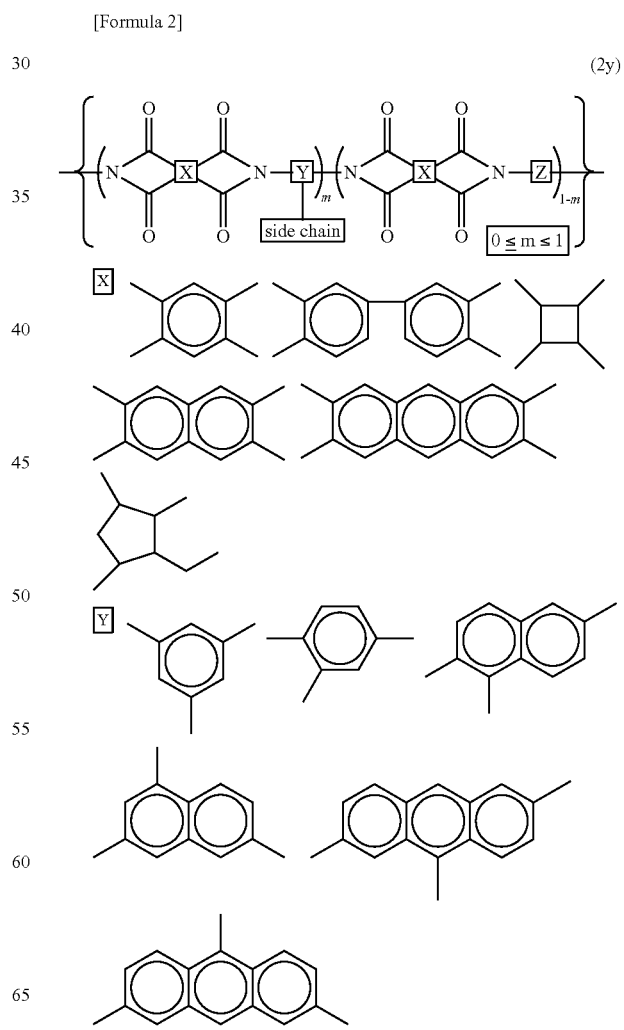

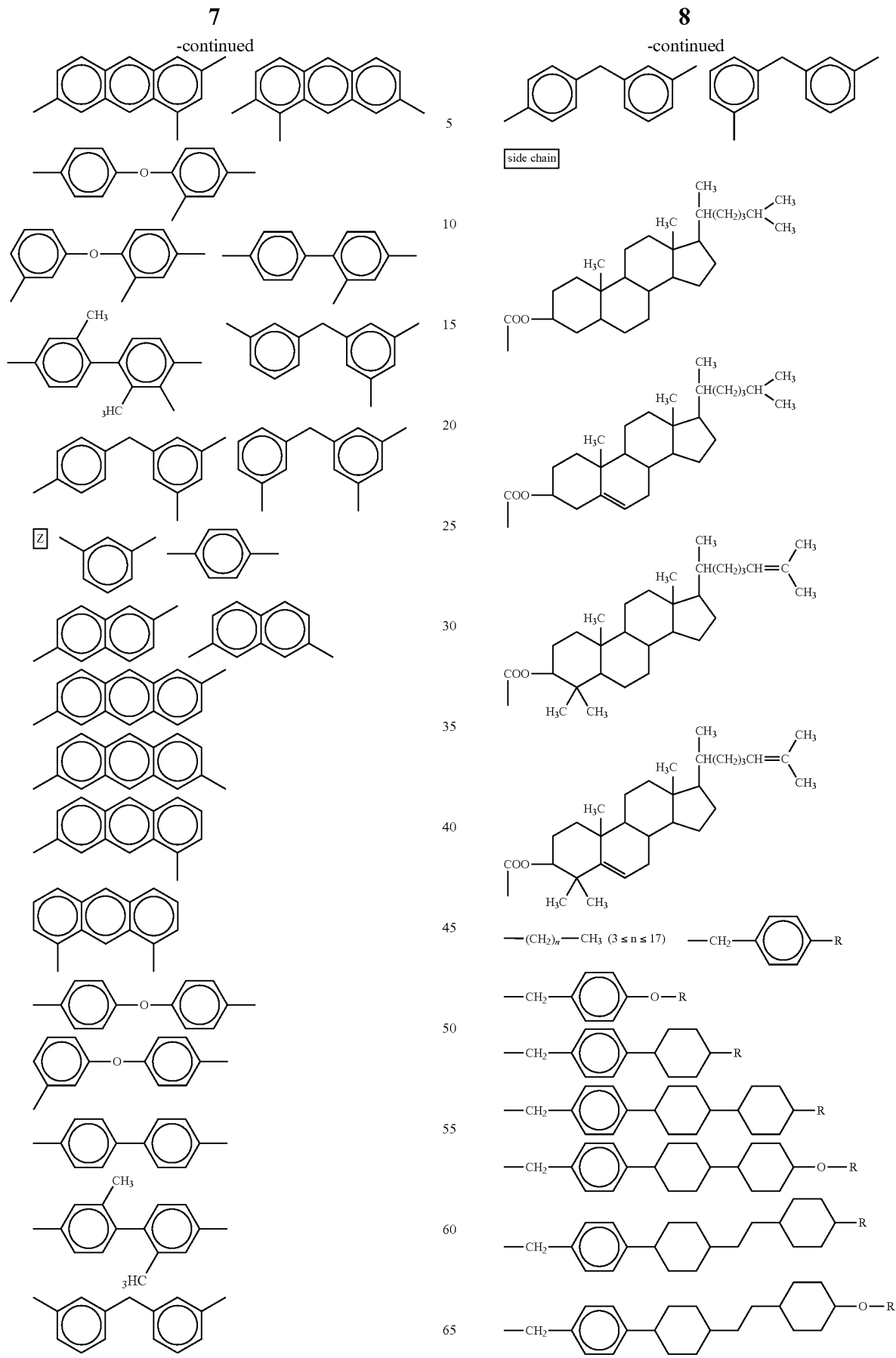

-continued
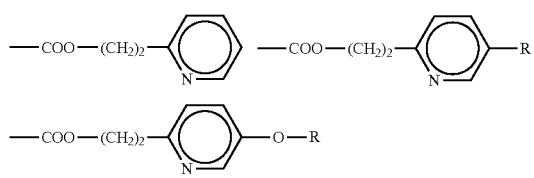
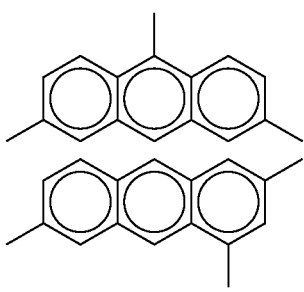
where R is a saturated alkyl group or an unsaturated alkyl group having 3 to 18 carbons.
In one embodiment, the second polyimide is represented by general formula (3).
[Formula 3]
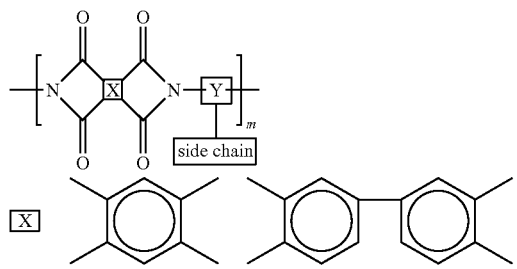
(3)
X
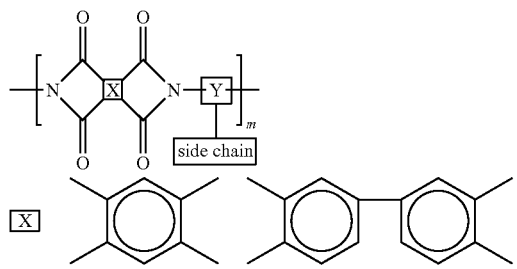
Y
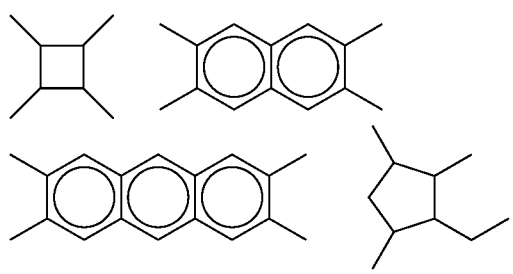
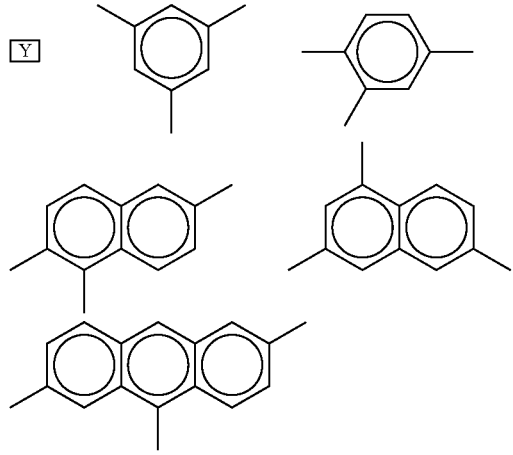
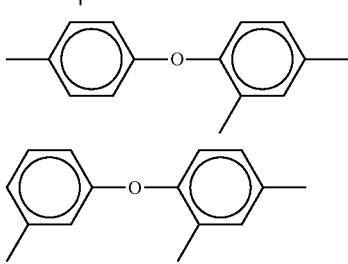
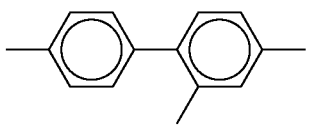
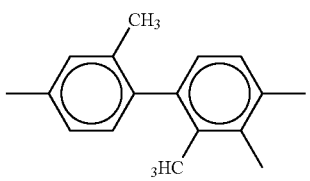
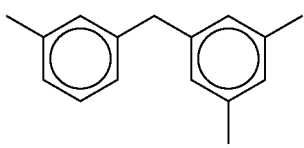
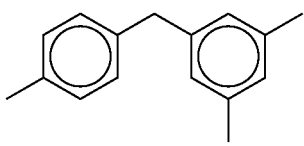
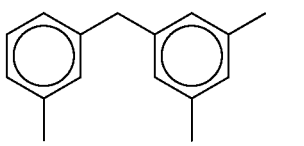

In one embodiment, the second polyimide has a side chain represented by general formula (4),

[Formula 4]

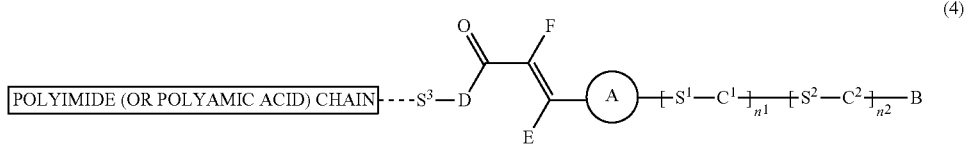

(4)

where A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear, or branched alkyl residue (which is optionally substituted by one cyano group or one or more halogen atoms, where one or more non-adjacent —$CH_2$— groups of the alkyl are optionally replaced by a group Q);

is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q);

$C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q));

D represents an oxygen atom or —$NR^1$— (where $R^1$ represents a hydrogen atom or lower alkyl);

$S^1$ and $S^2$ each independently of the other represent a single covalent bond or a spacer unit;

$S^3$ represents a spacer unit;

Q represents a group selected from —O—, —CO—, —CO—O—, —O—CO—, —Si$(CH_3)_2$—O—Si$(CH_3)_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, and —O—CO—O— (where $R^1$ represents a hydrogen atom or lower alkyl); and E and E each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH=CH—).

In one embodiment, the second polyimide has a fluorine group.

In one embodiment, the second polyimide has a photoreactive functional group.

In one embodiment, the photoreactive functional group is one selected from among a cinnamate group, a chalcone group, a tolan group, a coumarin group, and an azobenzene group.

In one embodiment, a side chain of the second polyimide has a vertical alignment group.

A liquid crystal display device according to the present invention is a liquid crystal display device comprising: an active matrix substrate having a pixel electrode; a counter substrate having a counter electrode; and a vertical-alignment type liquid crystal layer provided between the active matrix substrate and the counter substrate, wherein, at least one of the active matrix substrate and the counter substrate further includes an alignment film provided on the liquid crystal layer side; the alignment film includes a first alignment layer containing a first polyimide, and a second alignment layer containing a second polyimide different from the first polyimide and a polymerization product resulting from polymerization of a polyfunctional monomer; and the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

In one embodiment, the alignment film regulates liquid crystal molecules in the liquid crystal layer so that the liquid crystal molecules are inclined with respect to a normal direction of a principal face of the alignment film in the absence of an applied voltage.

In one embodiment, the liquid crystal display device has a plurality of pixels; and in each of the plurality of pixels, the liquid crystal layer has a plurality of liquid crystal domains having respectively different reference alignment azimuths.

In one embodiment, the plurality of liquid crystal domains are four liquid crystal domains.

A method of forming an alignment film according to the present invention comprises the steps of: forming a first alignment layer containing a first polyimide; and forming a second alignment layer containing a second polyimide different from the first polyimide and a polymerization product resulting from polymerization of a polyfunctional monomer.

In one embodiment, the step of forming the first alignment layer comprises: a step of providing a first alignment layer material containing a precursor of the first polyimide; a step of applying the first alignment layer material; and a step of imidizing the precursor of the first polyimide to form the first polyimide.

In one embodiment, the step of forming the first polyimide comprises, after applying the first alignment layer material, a step of conducting a pre-bake and thereafter conducting a post-bake at a higher temperature than in the pre-bake.

In one embodiment, the step of forming the second alignment layer comprises: a step of providing a second alignment layer material containing a precursor of the second polyimide and a polyfunctional monomer; a step of applying the second alignment layer material on the first alignment layer; and a step of forming the second polyimide resulting from imidization of the precursor of the second polyimide and forming the polymerization product resulting from polymerization of the polyfunctional monomer.

In one embodiment, in the step of providing the second alignment layer material, the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

In one embodiment, in the step of providing the second alignment layer material, a concentration of the polyfunctional monomer on the basis of the second alignment layer material is no less than 2 wt % and no more than 20 wt %.

Advantageous Effects of Invention

According to the present invention, image sticking caused by changes in the pretilt angle can be suppressed.

BRIEF DESCRIPTION OF DRAWINGS

FIG. 1 A schematic cross-sectional view of an embodiment of an alignment film according to the present invention.

FIG. 2(a) is a schematic diagram of an embodiment of a liquid crystal display device according to the present invention; and (b) is a schematic diagram of a liquid crystal panel of the liquid crystal display device of the present embodiment.

DESCRIPTION OF EMBODIMENTS

Figure 3:
FIG. 3(a) to (c) are schematic diagrams each illustrating a production method of the liquid crystal display device of the present embodiment.
Figure 3:
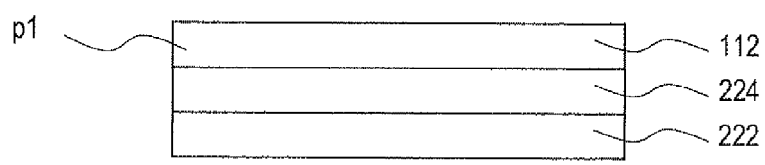
Figure 3:
Figure 3:
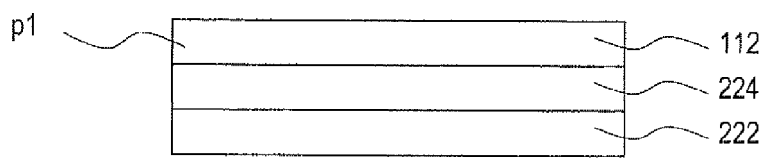

Hereinafter, with reference to the drawings, an embodiment of an alignment film according to the present invention and a liquid crystal display device having the alignment film will be described.

FIG. 1 shows a schematic diagram of an alignment film 100 of the present embodiment. The alignment film 100 includes first alignment layer 102 containing a first polyimide p1 and a second alignment layer 104 containing a second polyimide p2 and a polymerization product po. The second alignment layer 104 is located on an upper side of the first alignment layer 102. In the alignment film 100, the main chains of the first and second polyimides p1 and p2 align in essentially one direction.

The first polyimide p1 is one that has small fluctuations in its electrical characteristics after voltage application, and the first alignment layer 102 effectively functions to reduce residual DC voltage. The first polyimide p1 may be a polyimide that serves as a component of a so-called horizontal alignment film, or a polyimide that serves as a component of a so-called vertical alignment film.

The second polyimide p2 is one that leads to greatly varying pretilt angles of liquid crystal molecules depending on the alignment treatment, and the second alignment layer 104 effectively functions for the alignment control of liquid crystal molecules. The second polyimide p2 may be a polyimide having a vertical alignment group as a side chain. Alternatively, the second polyimide p2 may have a photoreactive functional group in its side chain or main chain. The photoreactive functional group is a cinnamate group, a chalcone group, a tolan group, a coumarin group, or an azobenzene group, for example.

From the standpoint of reducing residual DC voltage, it is preferable that the first alignment layer 102 is as thick as possible. It is preferable that the thickness of the first alignment layer 102 is 50 nm or more, for example. However, if the first alignment layer 102 is too thick, the time required for baking becomes too long. Therefore, it is preferable that the thickness of the first alignment layer 102 is 120 nm or less. From the standpoint of alignment control of liquid crystal molecules, it is preferable that the second alignment layer 102 is as thin as possible. The thickness of the second alignment layer 102 is no less than 10 nm and no more than 30 nm, for example.

For example, the first and second polyimides p1 and p2 are formed through imidization (polymerization) of different precursors. Note that, from the standpoint of reducing residual DC voltage, it is preferable that the fraction of imide units of the first polyimide p1 is lower than that of the second polyimide p2. For example, the fraction of imide units of the second polyimide p2 is 50% or more and the fraction of imide units of the first polyimide p1 is 50% or less.

The alignment film 100 of the present embodiment includes a second alignment layer 104 containing the polymerization product po, such that the polymerization product po exists also on the surface of the alignment film 100. The polymerization product po is formed through polymerization of a polyfunctional monomer. The polymerization is performed by applying heat or light to the polyfunctional monomer.

The alignment film 100 is formed in the following manner. First, an alignment film material is provided. In the alignment film material of the present embodiment, the material for forming the first alignment layer 102 is different from the material for forming the second alignment layer 104. In the following description, the material for forming the first alignment layer 102 will be referred to as a first alignment layer material, whereas a material for forming the second alignment layer 104 will be referred to as a second alignment layer material. The first alignment layer material is obtained by allowing a precursor of the first polyimide p1 to be dissolved in a solvent. The second alignment layer material is obtained by allowing a precursor of the second polyimide p2 to be dissolved in a solvent, and further mixing a polyfunctional monomer thereto. The concentration of the polyfunctional monomer on the basis of the second alignment layer material is no less than 2 wt % and no more than 20 wt %.

The first alignment layer material is applied. Application of the first alignment layer material is performed by a printing technique, an ink jet technique, or a spin coating technique. Next, the solvent is removed from the alignment layer material. For example, the solvent is removed through a heat treatment. The heat treatment also allows the precursor of the first polyimide p1 to be imidize into the first polyimide p1, thereby forming the first alignment layer 102.

After thus forming the first alignment layer 102, a second alignment layer material is applied on the first alignment layer 102. Application of the second alignment layer material is performed by a printing technique, an ink jet technique, or a spin coating technique. Next, the solvent is removed from the alignment layer material. For example, the solvent is removed through a heat treatment. The heat treatment also forms the second alignment layer 104, containing the second polyimide p2 into which the precursor of the second polyimide p2 has imidized and the polymerization product po into which the polyfunctional monomer has polymerized. The polymerization product po exists also on the surface of the alignment film 100, whereby changes in the pretilt angle of the liquid crystal molecules are suppressed.

The polymerization product po which is formed through polymerization of the polyfunctional monomer has a three-dimensional network structure. Moreover, this polyfunctional monomer may have two or more directly-bonded ring structures or one or more condensed ring structures between a plurality of functional groups, in which case the degree of freedom with respect to deformation is low, such that the polymerization product po is unlikely to deform under stress. By containing the polymerization product po as such, the alignment film 100 is structurally stabilized, whereby fluctuations of the alignment characteristics are suppressed. For example, the polyfunctional monomer contains at least one monomer from among dimethacrylate, diacrylate, diacrylamide, and dimethacrylamide having a plurality of vinyl groups.

Hereinafter, with reference to FIG. 2, a liquid crystal display device 200 having alignment films 110 and 120 according to the present embodiment will be described. FIG. 2(a) shows a schematic diagram of the liquid crystal display device 200. The liquid crystal display device 200 includes a liquid crystal panel 300, a driving circuit 350 for driving the liquid crystal panel 300, and a control circuit 360 for controlling the driving circuit 350. Although not shown, the liquid crystal display device 200 may include a backlight as necessary.

As shown in FIG. 2(b), the liquid crystal panel 300 includes an active matrix substrate 220 having the first alignment film 110, a counter substrate 240 having the second alignment film 120, and a liquid crystal layer 260 provided between the active matrix substrate 220 and the counter substrate 240. The active matrix substrate 220 further includes a first insulative substrate 222 and pixel electrodes 224, such that the first alignment film 110 covers the pixel electrodes 224. Moreover, the counter substrate 240 further includes a second insulative substrate 242 and a counter electrode 244, such that the second alignment film 120 covers the counter electrode 244. The liquid crystal layer 260 is interposed between the active matrix substrate 220 and the counter substrate 240. For example, the first and the second insulative substrates 222 and 242 are transparent glass substrates.

The liquid crystal display device 200 includes pixels composing a matrix of a plurality of rows and a plurality of columns. On the active matrix substrate 220, at least one switching element (e.g., thin film transistor (Thin Film Transistor: TFT)) (not shown in the figure) is provided for each pixel, and the active matrix substrate 220 is also referred to a TFT substrate. In the present specification, a "pixel" refers to the smallest unit that expresses a specific gray scale level in displaying; in the case of multicolor displaying, a "pixel" corresponds to a unit that expresses a gray scale level of each of R, G, and B, for example, and is also referred to as a dot. A combination of an R pixel, a G pixel, and a B pixel composes a single color displaying pixel. A "pixel region" refers to a region of the liquid crystal panel 300 that corresponds to a "pixel" in displaying.

Although not shown, a polarizer is provided on each of the active matrix substrate 220 and the counter substrate 240. Therefore, the two polarizers are disposed so as to oppose each other with the liquid crystal layer 260 interposed therebetween. The transmission axes (polarization axes) of the two polarizers are positioned so as to be orthogonal to each other, such that one of them extends along the horizontal direction (row direction), whereas the other extends along the vertical direction (column direction).

The first alignment film 110 includes a first alignment layer 112 containing the first polyimide p1 and a second alignment layer 114 containing the second polyimide p2 and the polymerization product po. The second alignment layer 114 is located on the liquid crystal layer 260 side of the first alignment layer 112. Similarly, the second alignment film 120 includes a first alignment layer 122 containing the first polyimide p1 and a second alignment layer 124 containing the second polyimide p2 and the polymerization product po. The second alignment layer 124 is located on the liquid crystal layer 260 side of the first alignment layer 122.

The first polyimide p1 is formed by imidizing the precursor thereof. Also, the second polyimide p2 is formed by imidizing the precursor thereof. The polymerization product po is formed through polymerization of a polyfunctional monomer. The polymerization is performed by applying heat or light to the polyfunctional monomer.

The first alignment film 110 is made of two different alignment layer materials. The first alignment layer material is obtained by allowing the precursor of the first polyimide p1 to be dissolved in a solvent. For example, after applying the first alignment layer material onto the pixel electrodes 224, a heat treatment is performed to effect solvent evaporation and imidization, whereby the first alignment layer 112 containing the first polyimide p1 is formed. The heat treatment is performed twice at different temperatures, for example.

On the other hand, the second alignment layer material is obtained by allowing the precursor of the second polyimide p2 and a polyfunctional monomer to be dissolved in a solvent. For example, after applying the second alignment layer material onto the first alignment layer 112, a heat treatment is performed to evaporate the solvent and effect imidization and polymerization, whereby the second alignment layer 114 containing the second polyimide p2 and the polymerization product po is formed. The heat treatment is performed twice at different temperatures, for example. Thus, the first alignment film 110 is formed.

Similarly, after applying the first alignment layer material onto the counter electrode 244, a heat treatment is performed to effect solvent evaporation and imidization, whereby the first alignment layer 122 containing the first polyimide p1 is formed. Then, after applying the second alignment layer material onto the first alignment layer 122, a heat treatment is performed to evaporate the solvent and effect imidization and polymerization, whereby the second alignment layer 124 containing the second polyimide p2 and the polymerization product po is formed. Thus, the second alignment film 120 is formed.

The liquid crystal layer 260 contains a nematic liquid crystal material (liquid crystal molecules 262) having negative dielectric anisotropy. The first alignment film 110 and the second alignment film 120 are each treated so that the pretilt angle of the liquid crystal molecules 262 is less than 90° with respect to the surface of the vertical alignment film. The pretilt angle of the liquid crystal molecules 262 is an angle between principal faces of the first alignment film 110 and the second alignment film 120 and the major axis of each liquid crystal molecule 262 that is regulated in a pretilt direction.

Although the liquid crystal layer 260 is of a vertical-alignment type, due to the second alignment layers 114 and 124 containing the second polyimide p2, the liquid crystal molecules 262 in their neighborhood are slightly inclined from the normal directions of the principal faces of the first and second alignment films 110 and 120. The pretilt angle is within a range from 85° to 89.7°, for example. The pretilt angle is measured by a crystal rotation technique, for example. The side chain of the second polyimide p2 defines the pretilt direction of the liquid crystal molecules 262. In the following description, this component may also be referred to as a pretilt-angle-exhibiting component.

Note that the pretilt azimuth of the liquid crystal molecules 262 introduced by the first alignment film 110 is different from the pretilt azimuth of the liquid crystal molecules 262 introduced by the second alignment film 120. For example, the pretilt azimuth of the liquid crystal molecules 262 introduced by the first alignment film 110 intersects, at 90°, the pretilt azimuth of the liquid crystal molecules 262 introduced by the second alignment film 120. Herein, no chiral agent is added to the liquid crystal layer 260, so that, when a voltage is applied across the liquid crystal layer 260, the liquid crystal molecules within the liquid crystal layer 260 take a twist alignment in accordance with the alignment regulating forces from the first and second alignment films 110 and 120. However, a chiral agent may be added to the liquid crystal layer 260 as necessary. In combination with polarizers which are placed in crossed Nicols, the liquid crystal layer 260 performs displaying in normally black mode.

Moreover, each of the first and second alignment films 110 and 120 may have a plurality of alignment regions for each pixel. For example, a portion of the first alignment film 110 may be masked, and after a predetermined region of the first alignment film 110 is irradiated with light from a certain direction, another region which was not irradiated with light may be irradiated with light from a different direction. Furthermore, the second alignment film 120 may be similarly formed. In this manner, regions that confer different alignment regulating forces can be formed in each of the first and second alignment films 110 and 120.

For example, the first polyimide p1 is represented by general formula (2x).

[Formula 5]

(2x)

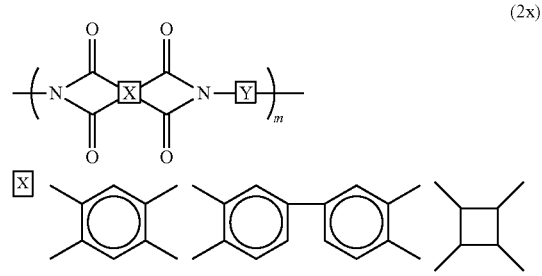

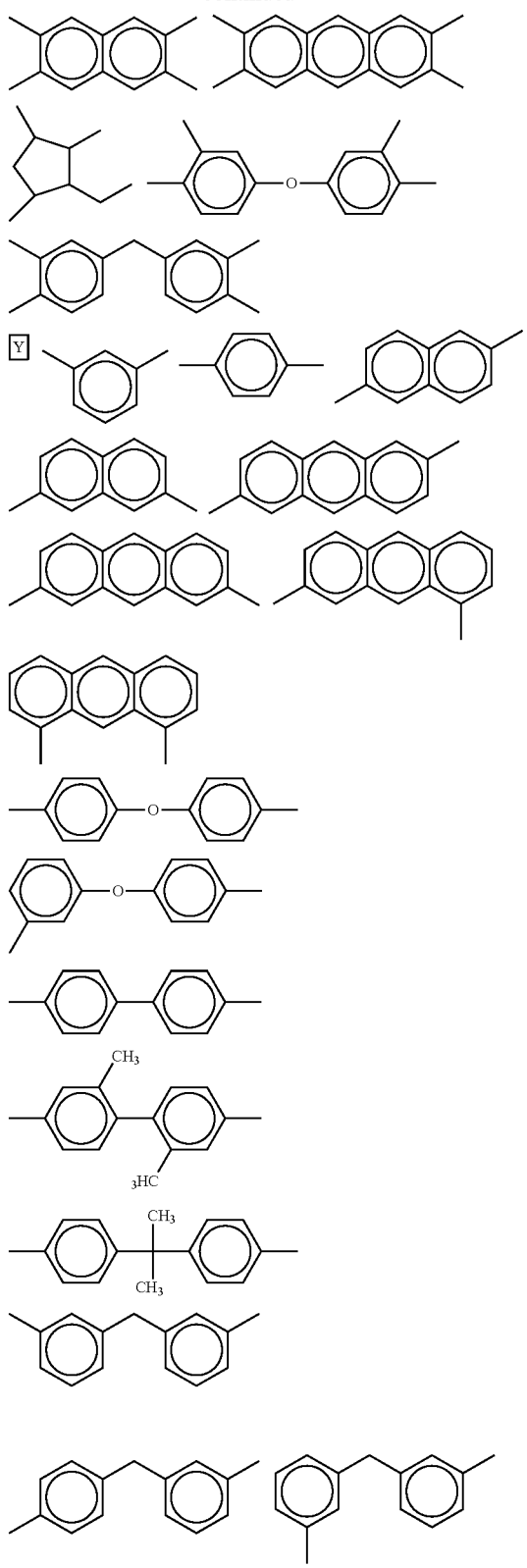

The first polyimide p1 represented by general formula (2x) is one that may be used as a component of a so-called horizontal alignment film. More specifically, the first polyimide p1 is represented by structural formula (2xa).

[Formula 6]
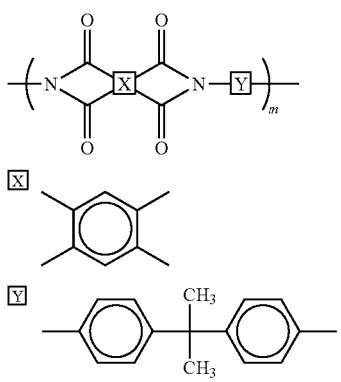
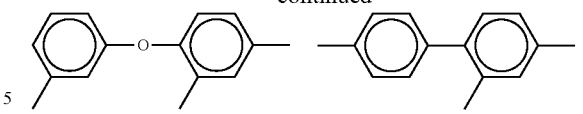
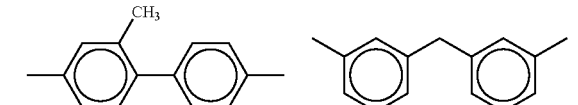
Alternatively, the first polyimide p1 is represented by general formula (2y).
[Formula 7]
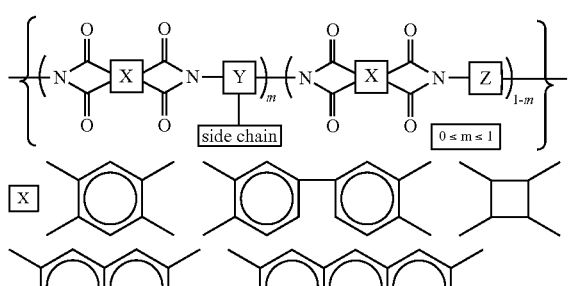
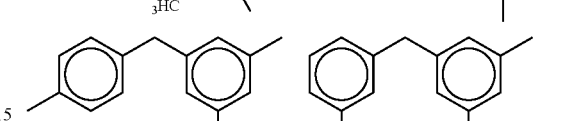
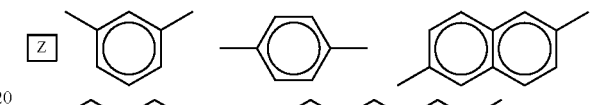
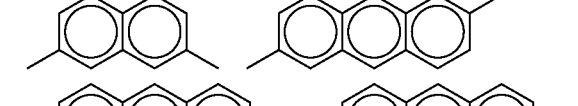
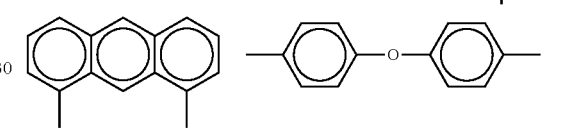
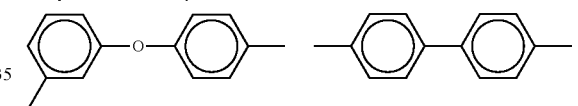
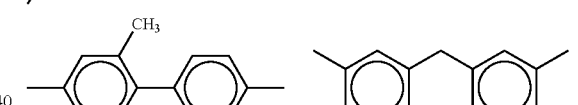
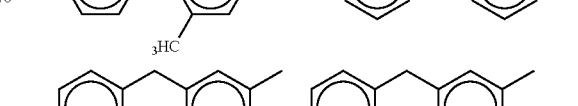
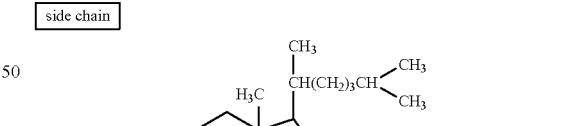
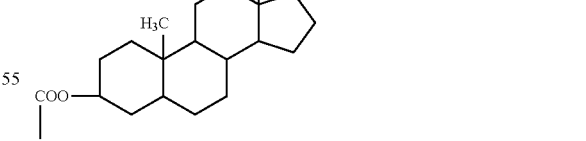

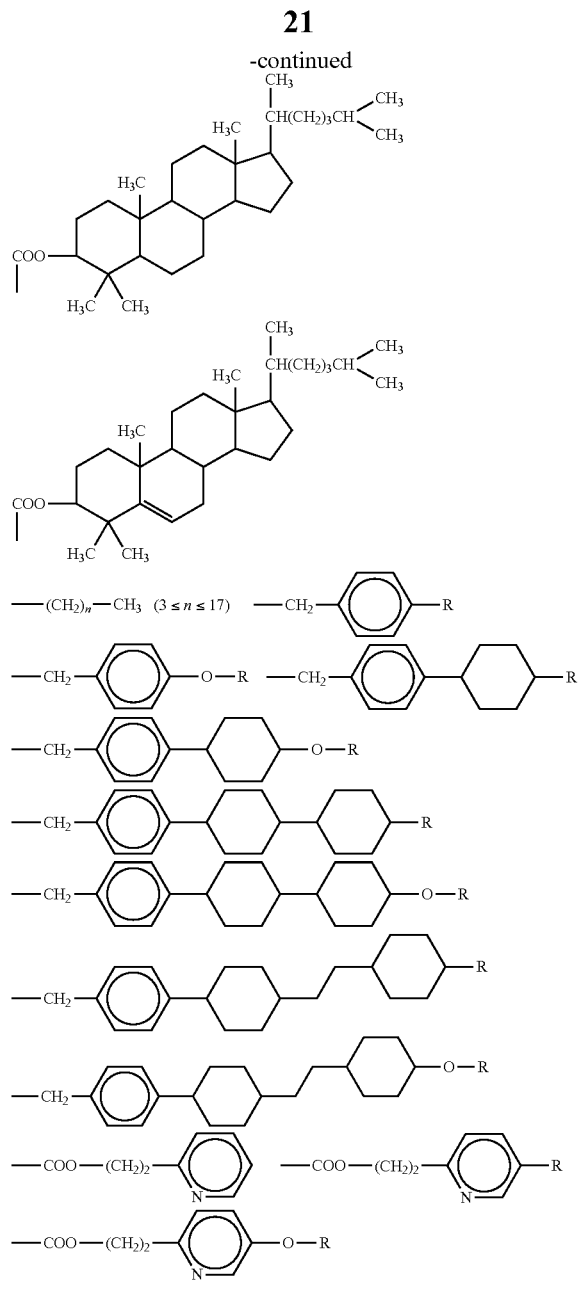

Herein, the R in the side chain is a saturated alkyl group or an unsaturated alkyl group having 3 to 18 carbons. Note that the first polyimide p1 represented by general formula (2y) is one that may be used as a component of a so-called vertical alignment film.

For example, the second polyimide p2 is represented by general formula (3).

[Formula 8]

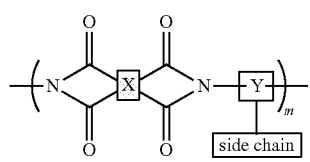

(3)

Note that the side chain of the second polyimide p2 may include a photoreactive functional group. In this case, a dimerization site is formed in the side chain through light irradiation. The second alignment layers 114 and 124 containing the second polyimide p2 as such may also be referred to as a photo-alignment layer. For example, the side chain of the second polyimide (Polyimide: PI) p2 is represented by general formula (4).

[Formula 9]

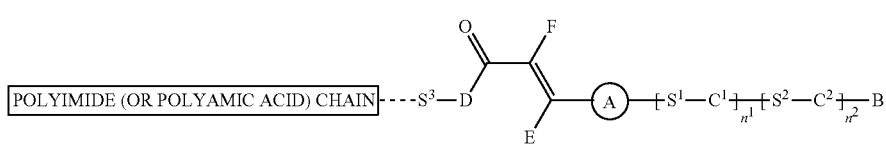

(4)

Herein, A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear, or branched alkyl residue (which is optionally substituted by one cyano group or one or more halogen atoms, where one or more non-adjacent —$CH_2$— groups of the alkyl are optionally replaced by a group Q).

B is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q).

$C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q)). D represents an oxygen atom or $NR^1$— (where $R^1$ represents a hydrogen atom or lower alkyl).

$S^1$ and $S^2$ each independently of the other represent a single covalent bond or a spacer unit. $S^3$ represents a spacer unit.

Q represents a group selected from —O—, —CO—, —CO—O—, —O—CO—, —Si(CH$_3$)$_2$—O—Si(CH$_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, and —O—CO—O— (where $R^1$ represents a hydrogen atom or lower alkyl). E and F each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH=CH—).

Note that it is preferable that A includes an aromatic compound; B includes fluorocarbon; D includes at least one or more hydrocarbon groups; and E and F include hydrogen atoms.

Moreover, this side chain may contain a fluorine atom. When the side chain contains a fluorine atom, the aforementioned image sticking is suppressed to a certain extent.

Specifically, the second polyimide p2 is represented by structural formula (3a).

[Formula 10]

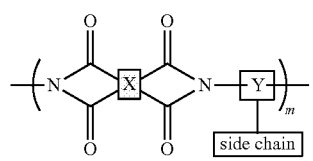

(3a)

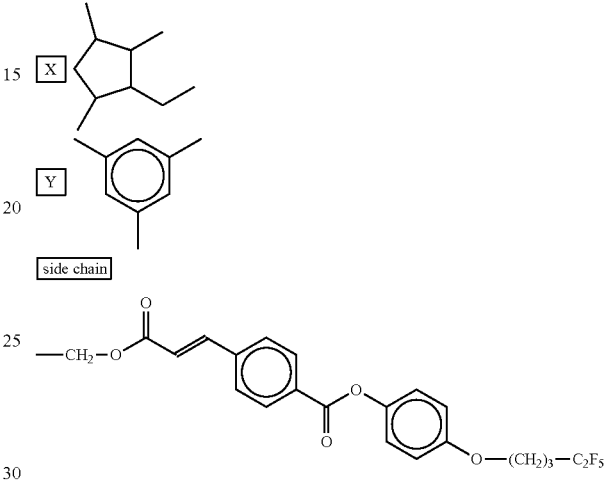

In this case, by irradiating the first or second alignment film 110, 120 with light from an oblique direction with respect to the normal direction of its principal face, an alignment regulating force is applied to the second polyimide p2 such that the liquid crystal molecules 262 are aligned so as to be inclined from the normal directions of the principal faces of the first and second alignment films 110 and 120 in the absence of an applied voltage. The second polyimide p2 represented by structural formula (3a) is also referred to as a photo-alignable polyimide, and such a treatment is also referred to as a photo-alignment treatment. Since a photo-alignment treatment is performed without involving any contact, static electricity will not occur due to friction as in a rubbing treatment, and thus the production yield can be improved.

Although the above description illustrates that the second polyimide p2 has a photoreactive functional group, and that a photo-alignment treatment is performed as an alignment treatment, the present invention is not limited thereto. The side chain of the second polyimide p2 may have a vertical alignment group, and a rubbing treatment or an ion beam irradiation may be performed as an alignment treatment. As the precursor of the second polyimide p2, AL60101 manufactured by JSR Corporation may be used. The second polyimide p2 including a vertical alignment group in its side chain is also referred to as a vertical-alignment type polyimide. After forming the first and second alignment films 110 and 120, the first and second alignment films 110 and 120 may be subjected to a rubbing treatment or an ion beam irradiation, whereby a pretilt can be conferred to the liquid crystal molecules 262.

The polymerization product po is obtained by polymerizing a polyfunctional monomer. The polyfunctional monomer is represented by general formula (1).

P1-A1-(Z1-A2)$n$-P2   (1)

In general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; and Z1 is a —COO— group, a —OCO— group, a —O— group, a —CONH— group or a single bond, where n is 0, 1, or 2. For example, the main chain of the polyfunctional monomer has two ring structures, and the polyfunctional monomer is biphenyldimethacrylate, biphenyldiacrylate, biphenyldimethacrylamide, or biphenyldiacrylamide.

Note that the second polyimide p2 and the polymerization product po are present in the second alignment layer 114; however, in the first alignment layer 112, the first polyimide p1 is present, but not the polymerization product po. Similarly, both of the polyimide p2 and the polymerization product po are present in the second alignment layer 124; however, in the first alignment layer 122, the polyimide p1 is present, but not the polymerization product po.

The polymerization product po exists also on the surface of the first and second alignment films 110 and 120, whereby the first and second alignment films 110 and 120 are structurally stabilized, changes in the alignment function are suppressed, and the pretilt angle of the liquid crystal molecules 262 of the liquid crystal layer 260 is maintained. When the monomer is a monofunctional monomer, the resultant polymerization product, i.e., a long linear polymer, is liable to deformation, and therefore changes in the alignment function cannot be sufficiently suppressed. On the other hand, when the monomer is a polyfunctional monomer, its polymerization product can sufficiently suppress changes in the alignment function. Note that the alignment films 110 and 120 contain not only the polymerization product po but also the first and second polyimides p1 and p2, and thus the thermal resistance, solvent resistance, and hygroscopicity, and other characteristics of the alignment films 110 and 120 are not substantially deteriorated as compared to those of a generic alignment film which is made only of polyimide.

The concentration of the polymerization product po is much higher at the surface of the first and second alignment films 110 and 120 than in the interior of the first and second alignment films 110 and 120. The concentration of the polymerization product po is measured by, for example, time of flight-secondary ion mass spectrometry (TOF-SIMS) or X-ray photoelectron spectroscopy (XPS). In the case of XPS, for example, an apparatus manufactured by ULVAC-PHI, INCORPORATED may be used to analyze the atoms in the depth direction while etching with C60.

As mentioned earlier, the polymerization product po is present on the surface of the second alignment layers 114 and 124. Thus, since the polymerization product po is present on the surface of the first and second alignment films 110 and 120, changes in the pretilt angle of the liquid crystal molecules 262 can be efficiently suppressed.

Although the above description illustrates that the first polyimide p1 is imidized by applying a heat treatment to the precursor of the first polyimide p1 contained in the first alignment layer material, the present invention is not limited thereto. The first alignment layer material may contain a first polyimide p1 that has a certain fraction of imide units resulting from chemical imidization.

As another technique of suppressing image sticking caused by changes in the pretilt angle, Polymer Sustained Alignment Technology (hereinafter referred to as "PSA technique") is known. In the PSA technique, the pretilt direction of the liquid crystal molecules is controlled by a polymerization product that is generated by irradiating the polymerizable compound with an active energy ray (e.g., ultraviolet light) while applying a voltage across a liquid crystal layer in which a small amount of polymerizable compound (e.g., a photopolymerizable monomer) is mixed.

Now, differences between an alignment sustaining layer which is formed by a generic PSA technique and the polymerization product po in the alignment films 110 and 120 of the liquid crystal display device 200 of the present embodiment will be described.

In the PSA technique, the alignment sustaining layer exists on the alignment film, and when the liquid crystal panel is disassembled to analyze the surface of the active matrix substrate or the counter substrate by TOF-SIMS or XPS, ions or atoms derived from the polymerizable component will be detected at the outermost surface of the substrate. On the other hand, in the display device 200 of the present embodiment, the polymerization product po is contained in the alignment films 110 and 120, and when the liquid crystal panel is disassembled to similarly analyze the surface of the active matrix substrate 220 or the counter substrate 240, not only ions or atoms derived from the polymerization product po but also ions or atoms derived from the second polyimide p2 of the second alignment layers 114 and 124 will be detected, indicative that the second polyimide p2 and the polymerization product po are present at the surface of the active matrix substrate 220, and also that the second polyimide p2 and the polymerization product po are present at the surface of the counter substrate 240.

Moreover, in the PSA technique, a polymerization product is formed through light irradiation after producing a liquid crystal panel having an alignment film, whereas in the liquid crystal display device 200 of the present embodiment, the polymerization product po is contained in the first and second alignment films 110 and 120, and the polymerization product po is formed before the active matrix substrate 220 and the counter substrate 240 are attached together. Therefore, even if the active matrix substrate 220 and the counter substrate 240 is to be attached together in a different place from the place where the active matrix substrate 220 and the counter substrate 240 were produced, there is no need to effect formation of the polymerization product at the place where they are attached together, thus facilitating the production of the liquid crystal display device 200.

Moreover, in the PSA technique, the voltage holding ratio will be lowered if any unreacted monomer remains in the liquid crystal layer. Therefore, in the PSA technique, ultraviolet irradiation must be performed for a long time in order to reduce the remaining monomer. On the other hand, in the liquid crystal display device 200 of the present embodiment, a polymerization product for suppressing changes in the pretilt angle is formed in the alignment films, thus suppressing lowering of the voltage holding ratio and making it possible to omit irradiation ultraviolet over a long time.

In the liquid crystal display device 200 of the present embodiment, as described above, the alignment films 110 and 120 contain the polymerization product po, which fixes the pretilt direction of the liquid crystal molecules 262. This is presumably because the polymerization product po suppresses deformation of the pretilt-angle-exhibiting component, whereby the alignment direction of the liquid crystal molecules 262 introduced by the second polyimide p2 is maintained in a direction which is essentially vertical to the principal faces of the alignment films 110 and 120. Moreover, the polymerization product po stabilizes the impurities and the like which have occurred due to damage during the alignment treatment, thus suppressing generation of impurity ions and occurrence of image sticking.

In the liquid crystal display device 200 of the present embodiment, the polyfunctional monomer represented by general formula (1) above is introduced in the second alignment layer material, and film formation is conducted with a usual method, as a result of which the polymerization product po occurring through polymerization of the polyfunctional monomer exists on the liquid crystal layer 260 side of the first and second alignment films 110 and 120. Therefore, the pretilt angle of the liquid crystal molecules 262 can be stabilized, and it is possible to maintain a high voltage holding ratio and a low residual DC, thereby preventing image sticking. Since there is no need to perform photopolymerization after introducing the liquid crystal material unlike in the PSA technique, production with simple steps is possible, and the problem of a lowered voltage holding ratio due to any monomer remaining in the liquid crystal material is prevented.

Hereinafter, with reference to FIG. 3 and FIG. 4, a production method for the liquid crystal display device 200 will be described.

First, as shown in FIG. 3(a), the pixel electrodes 224 are formed on the first insulative substrate 222. Although not shown in FIG. 3(a), TFTs and wiring lines and the like that are connected thereto are provided between the first insulative substrate 222 and the pixel electrodes 224. Next, the first alignment film 110 covering the pixel electrodes 224 is formed.

Next, the first alignment film 110 covering the pixel electrodes 224 is formed. Formation of the first alignment film 110 is performed as follows. First, two alignment layer materials are prepared. The first alignment layer material is obtained (as a mixture) by allowing the precursor of the first polyimide p1 to be dissolved in a solvent.

For example, the precursor (polyamic acid) of the first polyimide p1 is represented by general formula (2x').

[Formula 11]

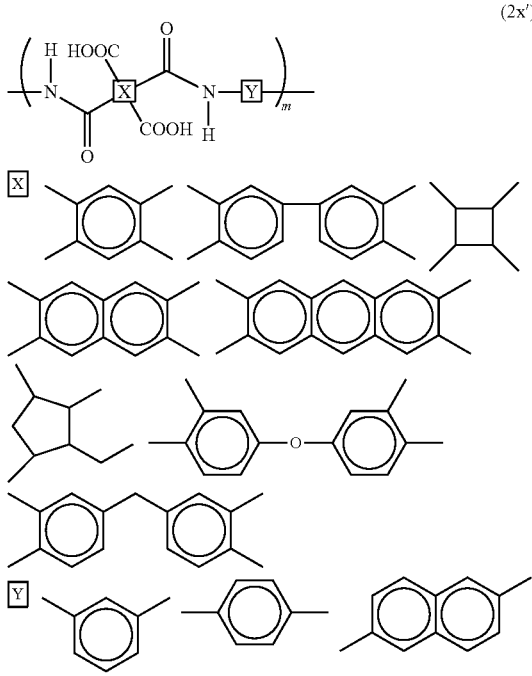

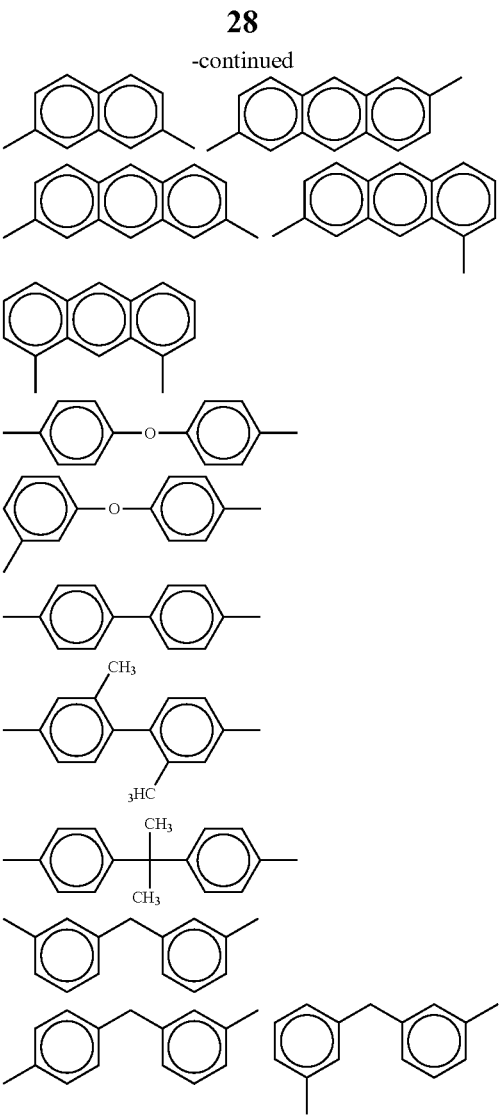

The precursor of the first polyimide p1 represented by general formula (2x') is one that may be used as the material of a so-called horizontal alignment film. More specifically, the precursor of the first polyimide p1 is represented by structural formula (2xa').

[Formula 12]

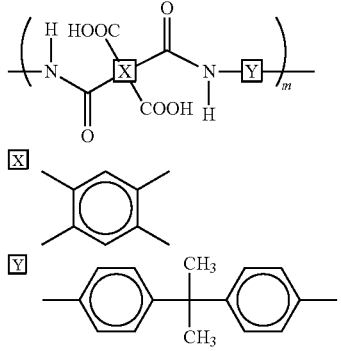

Alternatively, a compound represented by general formula (2y') may be used as the precursor (polyamic acid) of the first polyimide p1.
[Formula 13]
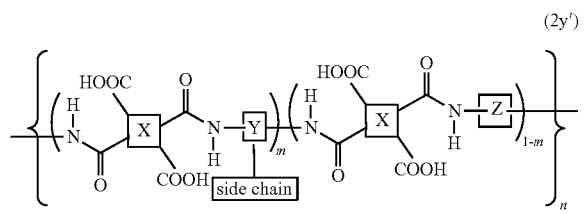
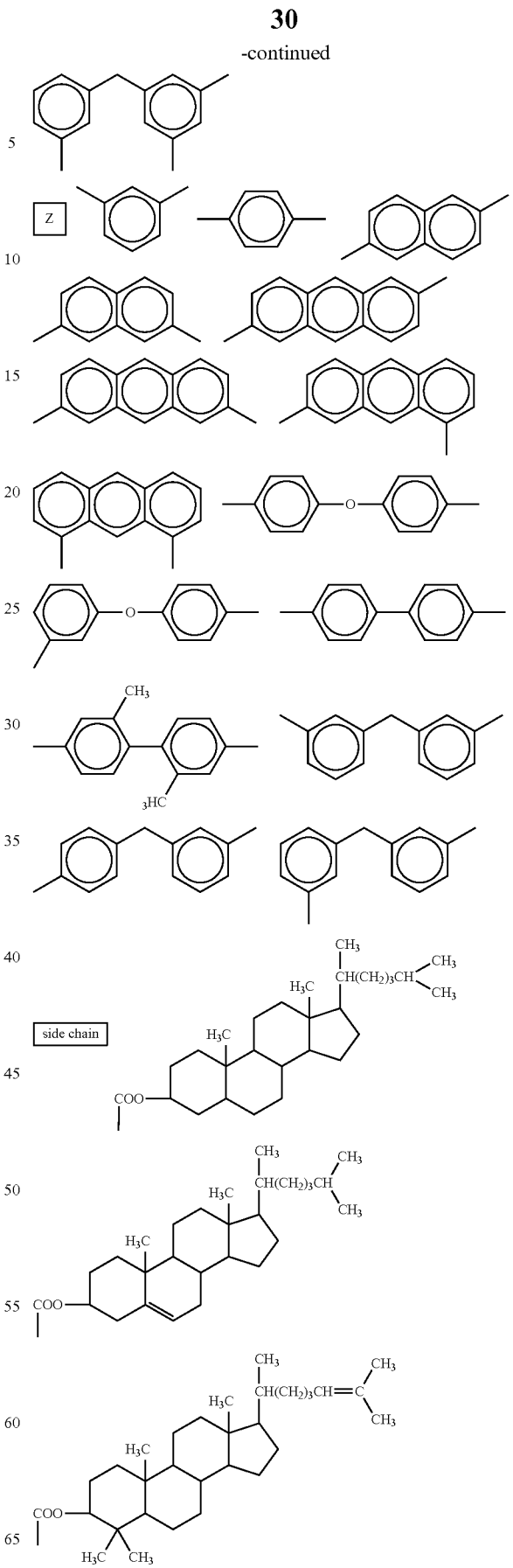

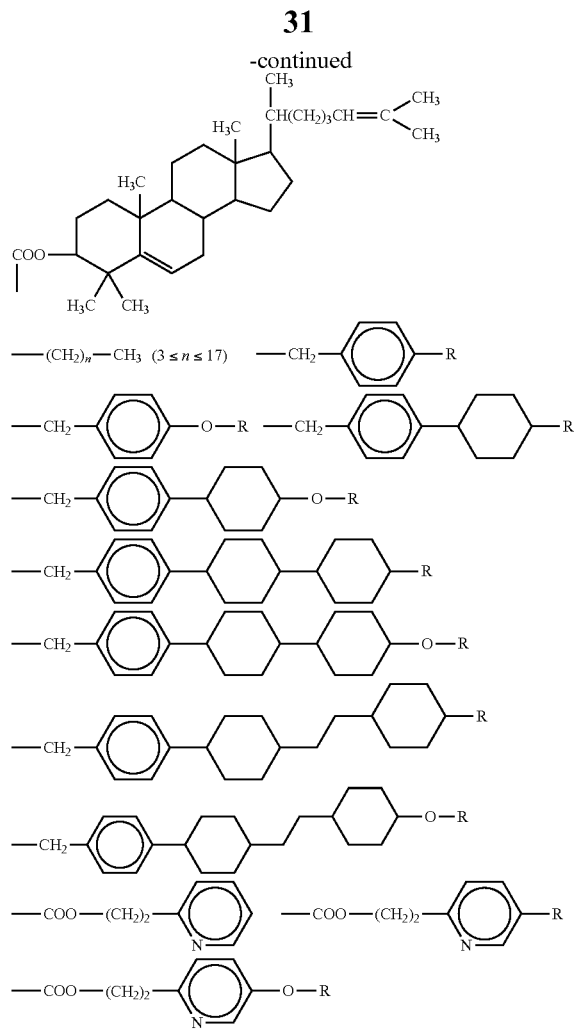

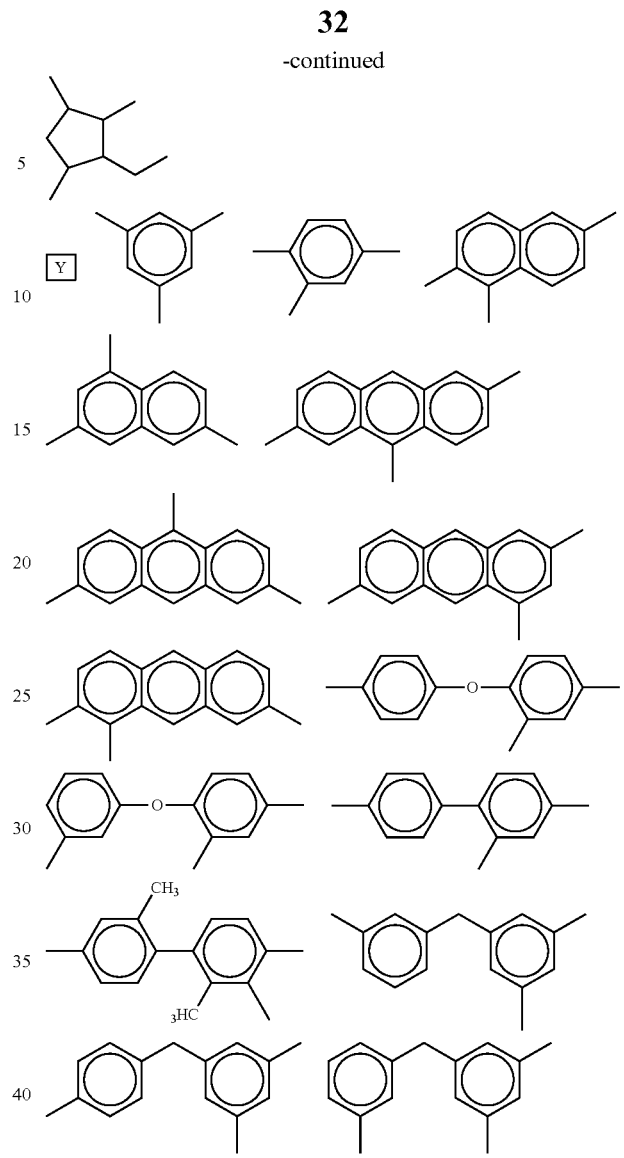

Herein, R is a saturated alkyl group or an unsaturated alkyl group having 3 to 18 carbons. The precursor of the first polyimide p1 represented by general formula (2y') is one that may be used as the material of a so-called vertical alignment film.

The second alignment layer material is obtained (as a mixture) by allowing the precursor of the second polyimide p2 and a polyfunctional monomer to be dissolved in a solvent. For example, the precursor (polyamic acid) of the second polyimide p2 is represented by general formula (3').

More specifically, the precursor of the second polyimide p2 is represented by structural formula (3a').

[Formula 14]

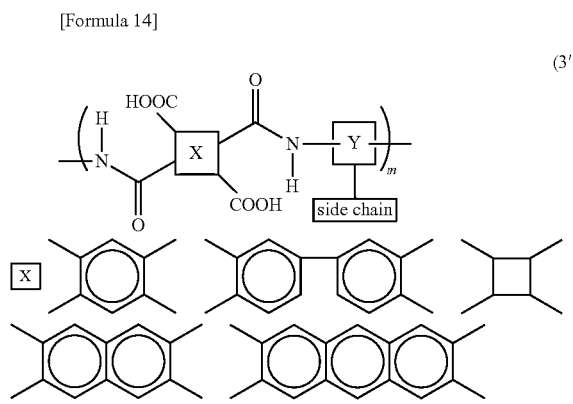

[Formula 15]

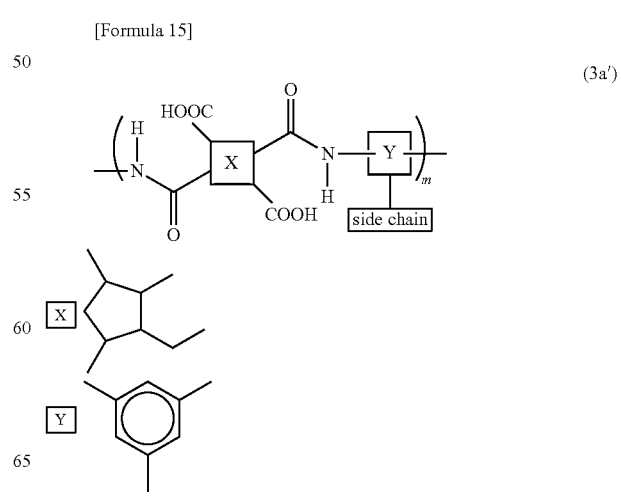

-continued

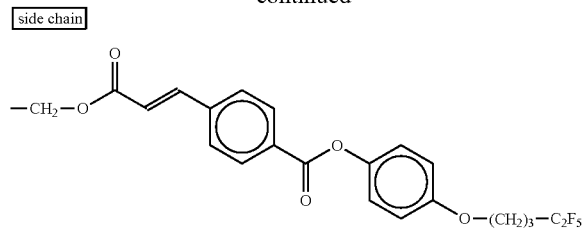

The side chain of the precursor of the second polyimide p2 (Polyamic Acid: PAA) is represented by general formula (4).

[Formula 16]

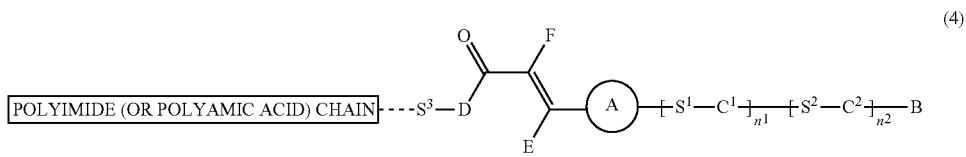

(4)

A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear, or branched alkyl residue (which is optionally substituted by one cyano group or one or more halogen atoms, where one or more non-adjacent —$CH_2$— groups of the alkyl are optionally replaced by a group Q).

B is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q).

$C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q)). D represents an oxygen atom or —$NR^1$— (where $R^1$ represents a hydrogen atom or lower alkyl).

$S^1$ and $S^2$ each independently of the other represent a single covalent bond or a spacer unit. $S^3$ represents a spacer unit.

Q represents a group selected from —O—, —CO—, —CO—O—, —O—CO—, —Si $(CH_3)_2$—O—Si $(CH_3)_2$—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, and —O—CO—O— (where $R^1$ represents a hydrogen atom or lower alkyl). E and F each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH=CH—).

Herein, it is preferable that A includes an aromatic compound; B includes fluorocarbon; D includes at least one or more hydrocarbon groups; and E and F include hydrogen atoms.

Note that the side chain of the second polyimide p2 may contain a fluorine atom. When the side chain of the second polyimide p2 contains a fluorine atom, the aforementioned image sticking is suppressed to a certain extent.

Moreover, the second polyimide p2 may have a side chain containing a cinnamate group as a photoreactive functional group. In this case, a dimerization site is formed in the side chain through light irradiation. Specifically, the second polyimide p2 is represented by formula (3a).

[Formula 17]

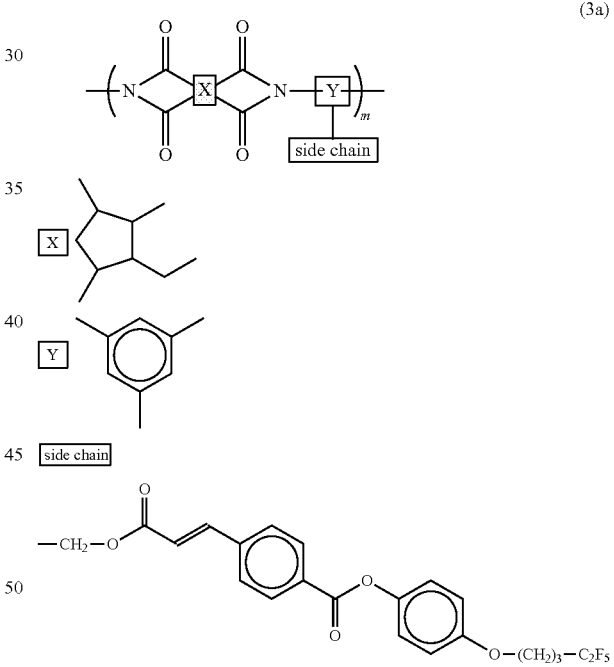

(3a)

The precursor thereof is represented by formula (3a').

[Formula 18]

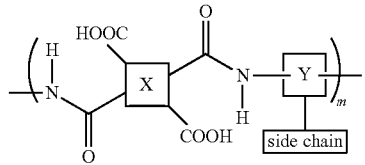

(3a')

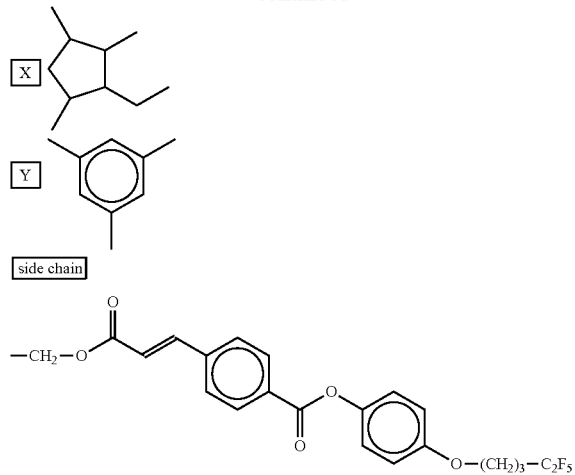

Note that the polyfunctional monomer does not form a covalent bond with the precursor of the second polyimide p2.

Thus, the first alignment layer material contains the precursor (polyamic acid) of the first polyimide p1, and the second alignment layer material contains the second polyimide p2 and the precursor (polyamic acid) thereof. Herein, the second polyimide and the precursor thereof have a photoreactive functional group in its side chain, as represented by structural formulae (3a) and (3a'), whereas the precursor of the first polyimide p1 does not have any photoreactive functional groups in its side chain, as represented by structural formula (2xa').

Alternatively, the second polyimide p2 may have a vertical alignment group in its side chain, and AL60101 manufactured by JSR Corporation may be used as the precursor thereof.

In the present embodiment, as described above, the second alignment layer material contains a polyfunctional monomer. The polyfunctional monomer may have two or more directly-bonded ring structures or one or more condensed ring structures, for example. For example, a methacrylate-type monomer, an acrylate-type monomer, a methacrylamide-type monomer, or an acrylamide-type monomer is used as the polyfunctional monomer.

The polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

Moreover, the solvent contains γ-butyrolactone and N-methylpyrrolidone (N-methylpyrrolidone: NMP), for example. The concentration of the polyfunctional monomer on the basis of the second alignment layer material is no less than 2 wt % and no more than 20 wt %, for example. Thus, by allowing the polyfunctional monomer to be contained in the second alignment layer material at a low concentration, it becomes possible to control the alignment of the liquid crystal molecules 262 with a small amount of polyfunctional monomer. Although a high polyfunctional monomer concentration might lower the transmittance of the liquid crystal display device, the concentration of the polyfunctional monomer may be low, whereby lowering of the transmittance can be suppressed.

Next, the first alignment layer material is applied, and a heat treatment is conducted. As the heat treatment, for example, two heat treatments may be performed at different temperatures. Specifically, after performing a first heat treatment, a second heat treatment is performed at a higher temperature than that of the first heat treatment. The first heat treatment removes most of the solvent. In the following description, what remains after the solvent has been substantially removed will be referred to as an alignment film. Moreover, through the subsequent second heat treatment, imidization progresses, whereby the alignment layer is stabilized. The first heat treatment is also referred to as a preliminary bake or a pre-bake, and the second heat treatment is also referred to as a full bake or a post-bake. Through the heat treatment, the polyamic acid is imidized, whereby the first polyimide p1 is formed. In this manner, the first alignment layer 112 shown in FIG. 3(b) is formed.

Next, as shown in FIG. 3(c), the second alignment layer material is applied through a nozzle, and a heat treatment is conducted to form the second alignment layer 114. As the heat treatment, for example, two heat treatments may be performed at different temperatures. Specifically, after performing a first heat treatment, a second heat treatment is performed at a higher temperature than that of the first heat treatment. The first heat treatment (pre-bake) removes most of the solvent. Moreover, through the subsequent second heat treatment (post-bake), imidization progresses, whereby the alignment layer is stabilized. Through the heat treatment, the polyamic acid is imidized, whereby the second polyimide p2 is formed. For each of the first alignment layer material and the second alignment layer material, the post-bake time is adjusted according to the type, thickness, and intended fraction of imide units of the alignment film. The fraction of imide units can be adjusted based on the heating temperature, for example. The post-bake temperature of the second alignment layer 114 may be the same as or different from that of the first alignment layer 112. For example, the post-bake time is preferably 10 minutes or more, and more preferably about 40 minutes. Moreover, through the heat treatment, the polyfunctional monomer is polymerized to form the polymerization product po, such that the polymerization product po exists also on the surface of the first alignment film 110. Note that the polymerization product po does not form a covalent bond with the second polyimide p2. In this manner, the second alignment layer 114 is formed.

Next, the first alignment film 110 is subjected to an alignment treatment. The alignment treatment may be performed after the first heat treatment, or after the second heat treatment, in the formation of the second alignment layer 114. For example, the alignment treatment is performed by irradiating the first alignment film 110 with light. For example, light of wavelengths in the range of no less than 250 nm and no more than 400 nm is radiated onto the first alignment film 110 at an irradiation dose of no less than 20 mJ/cm$^2$ and no more than 200 mJ/cm$^2$, from a direction which is inclined from the normal direction of the principal face of the first alignment film 110. If the irradiation dose increases from 200 mJ/cm$^2$, the alignment film may deteriorate so that the voltage holding ratio and the like may be lowered. Moreover, the irradiation angle of light may be in the range of no less than 5° and no more than 85°, and preferably no less than 40° and no more than 60°, from the normal direction of the principal face of the first alignment film 110. Note that, when the irradiation angle is small, it becomes difficult to confer a pretilt angle; when the irradiation angle is too large, it takes more time to confer the same pretilt. Moreover, light may be unpolarized light, linearly polarized light, elliptically polarized light, or circularly polarized light. However, linearly polarized light is to be used in the case where a cinnamate group is used as the photoreactive functional group. Alternatively, a rubbing treatment or an ion beam irradiation may be performed for the first alignment film 110 as the alignment treatment. In this manner, the active matrix substrate 220 shown in FIG. 4(*d*) is formed.

Figure 4:
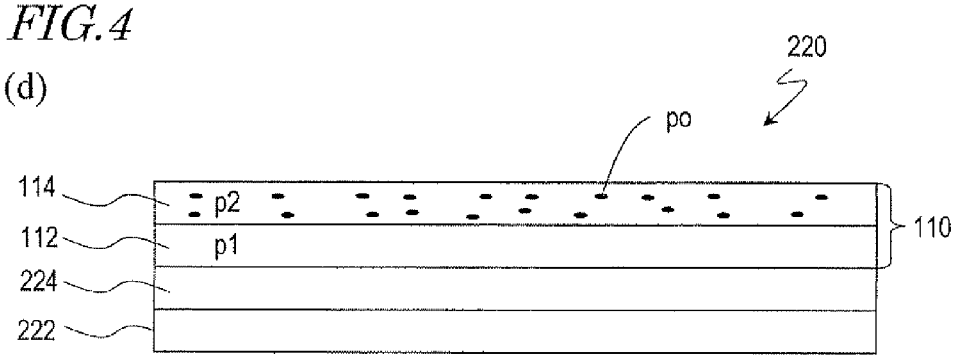
FIG. 4(d) to (f) are schematic diagrams each illustrating a production method of the liquid crystal display device of the present embodiment.
Figure 4:
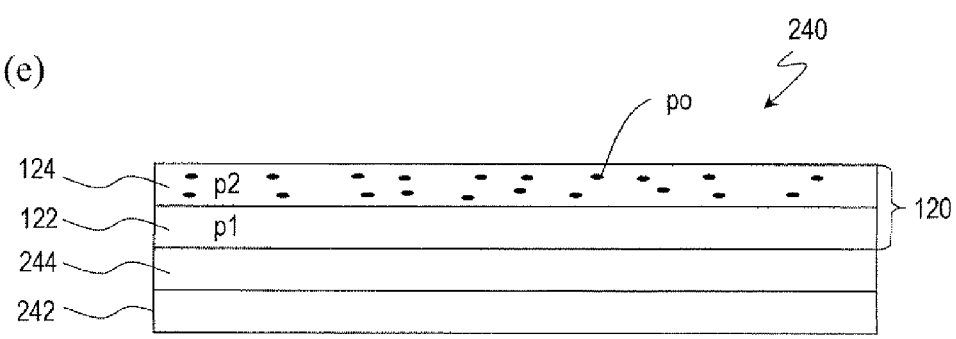
Figure 4:
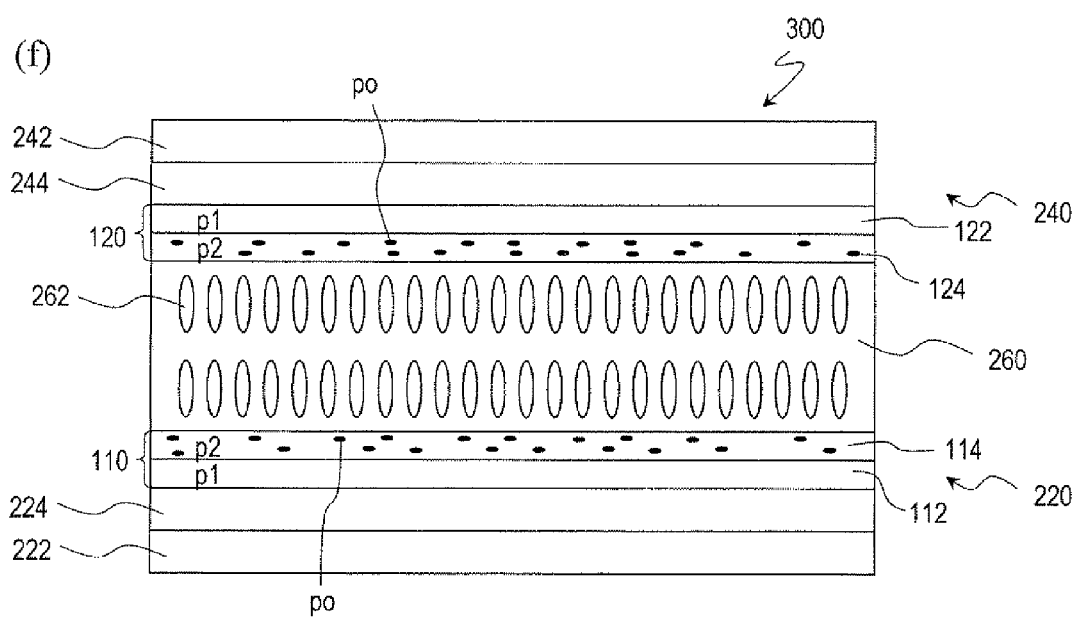

As shown in FIG. 4(*e*), the counter electrode 244 is formed on the second insulative substrate 242. Next, the second alignment film 120 is formed on the counter electrode 244. The second alignment film 120 is formed in a similar manner to the first alignment film 110 having been described with reference to FIG. 3(*a*) to FIG. 3(*c*).

First, an alignment layer material is prepared. For example, this alignment layer material is similar to that of the first alignment film 110. Next, the first alignment layer material is applied, and a heat treatment is conducted to form the first alignment layer 122. The first heat treatment removes most of the solvent. Through the subsequent second heat treatment, imidization progresses, whereby the alignment layer is stabilized. The polyamic acid is imidized to form the first polyimide p1.

Next, the second alignment layer material is applied, and a heat treatment is conducted to form the second alignment layer 124. The first heat treatment removes most of the solvent. Through the subsequent second heat treatment, imidization progresses, whereby the alignment layer is stabilized. Through the heat treatment, the polyamic acid is imidized to form the second polyimide p2. Moreover, through the heat treatment, the polyfunctional monomer is polymerized to form the polymerization product po, such that the polymerization product po exists also on the surface of the second alignment film 120. The second alignment film 120 thus formed is formed. Thereafter, the second alignment film 120 is subjected to an alignment treatment. The alignment treatment is performed in a similar manner to the first alignment film 110. Thus, the counter substrate 240 is formed.

Next, as shown in FIG. 4(*f*), the active matrix substrate 220 and the counter substrate 240 are attached together so that the first alignment film 110 and the second alignment film 120 oppose each other. In the present specification, the active matrix substrate and the counter substrate being attached together before formation of the liquid crystal layer may also be referred to as a "vacant panel".

Next, a liquid crystal material is provided, and the liquid crystal material is introduced between the first alignment film 110 and the second alignment film 120 of the vacant panel, thus forming the liquid crystal layer 260. As described above, the first and second alignment films 110 and 120 have been subjected to an alignment treatment, and thus the liquid crystal molecules 262 are aligned so as to be inclined from the normal directions of the principal faces of the first and second alignment films 110 and 120 even in the absence of an applied voltage. Moreover, the polymerization product po maintains the alignment of the liquid crystal molecules 262, whereby image sticking is suppressed. The liquid crystal panel 300 is produced in this manner. Thereafter, the driving circuit 350 and the control circuit 360 shown in FIG. 2(*a*) are mounted on the liquid crystal panel 300, whereby the liquid crystal display device 200 is produced.

In the aforementioned PSA technique, a polymerization product is formed under an applied voltage. In the case where ultraviolet for the purpose of polymerization product formation is radiated while thus applying a voltage, a complex fabrication apparatus is required in which a device for applying a voltage across the liquid crystal panel and a device for radiating ultraviolet light are integrated. Moreover, since ultraviolet light irradiation is performed after a voltage is applied across the liquid crystal panel for a long time for obtaining a predetermined alignment, this fabrication apparatus needs to be used for a long time. Moreover, when forming the liquid crystal layer of a liquid crystal panel through dropwise application of a liquid crystal material, generally speaking, a plurality of liquid crystal panels are simultaneously produced by using a large-sized mother glass substrate, and thereafter each liquid crystal panel is cut out from the large-sized mother glass substrate. In this case of simultaneously producing a plurality of liquid crystal panels, a design must be adopted such that special wiring lines are formed on the mother glass substrate for allowing a voltage to be simultaneously applied to the plurality of liquid crystal panels.

Moreover, in the case where a liquid crystal panel of a particularly large size is to be produced, it is difficult to uniformly apply a voltage across the liquid crystal layer in the respective pixels. If ultraviolet light irradiation is performed with non-uniform voltages being applied, there will be fluctuations in the pretilt angle.

Moreover, in the case of applying a voltage during polymerization product formation, ribs, slits, or rivets need to be provided on the pixel electrode and the counter electrode for improved viewing angle characteristics. This will result in an increased number of steps and a decrease in the effective aperture ratio.

On the other hand, according to the present embodiment, no voltage is applied when forming the polymerization product po. Therefore, the liquid crystal display device 200 can be easily produced without using a complex fabrication apparatus. Moreover, a liquid crystal panel can be easily produced even when producing the liquid crystal layer 260 through dropwise application of a liquid crystal material. Moreover, since it is not necessary to apply a voltage across the liquid crystal layer 260 of all pixels when forming the polymerization product po, changes in the pretilt angle among liquid crystal molecules 262 can be suppressed. Furthermore, the viewing angle can be improved without providing ribs, slits, or rivets on the pixel electrodes 224 and the counter electrode 244, thus reducing an increase in the number of steps.

Note that slits, ribs, and/or rivets may be provided on the pixel electrodes 224 and the counter electrode 244. Alternatively, slits, ribs, and/or rivets may not be provided on the pixel electrodes 224 and the counter electrode 244, and the liquid crystal molecules 262 may be aligned in accordance with an oblique electric field which is created by a highly-symmetrical pixel electrode 226 and the counter electrode 246. As a result, the alignment regulating force of the liquid crystal molecules 262 under an applied voltage can be further increased.

Although the above description illustrates that the first and second alignment films 110 and 120 are made of the same alignment layer material, the present invention is not limited thereto. The first and second alignment films 110 and 120 may be made of different alignment layer materials. For example, at least one of the first and second polyimides p1 and p2 and the polymerization product po of the first alignment film 110 may be different from at least one of the first and second polyimides p1 and p2 and the polymerization product po of the second alignment film 120.

Although the above description illustrates that the first and second alignment films 110 and 120 each contain the polymerization product po, the present invention is not limited thereto. Only one of the first and second alignment films 110 and 120 may contain the corresponding polymerization product po.

Although the above description illustrates that the active matrix substrate 220 and the counter substrate 240 respectively include the first and second alignment films 110 and 120, the present invention is not limited thereto. Only one of the active matrix substrate 220 and the counter substrate 240 may include the corresponding first or second alignment film 110 or 120.

Although the above description illustrates that polymerization product po is formed through a heat treatment, the present invention is not limited thereto. The polymerization product po may be formed through light irradiation. For example, in such light irradiation, a light source which mainly emits ultraviolet light (i-line) with a wavelength of 365 nm is suitably used. The irradiation time is about 500 seconds, for example, and the irradiation intensity of light is about 20 mW/cm$^2$. In the case where polymerization is effected through light irradiation, the polyfunctional monomer will sufficiently polymerize even if the irradiation intensity of light is 10 mW/cm$^2$ or less. The wavelength of light is preferably in the range of no less than 250 nm and no more than 400 nm, and more preferably in the range of no less than 300 nm and no more than 400 nm. However, polymerization will sufficiently occur with light of a wavelength greater than 400 nm. Although polymerization can occur with light of a wavelength of 300 nm or less, the irradiation dose should preferably be as small as possible because decomposition of organic matter will occur with irradiation of deep-ultraviolet with wavelengths near 200 nm.

Figure 5:
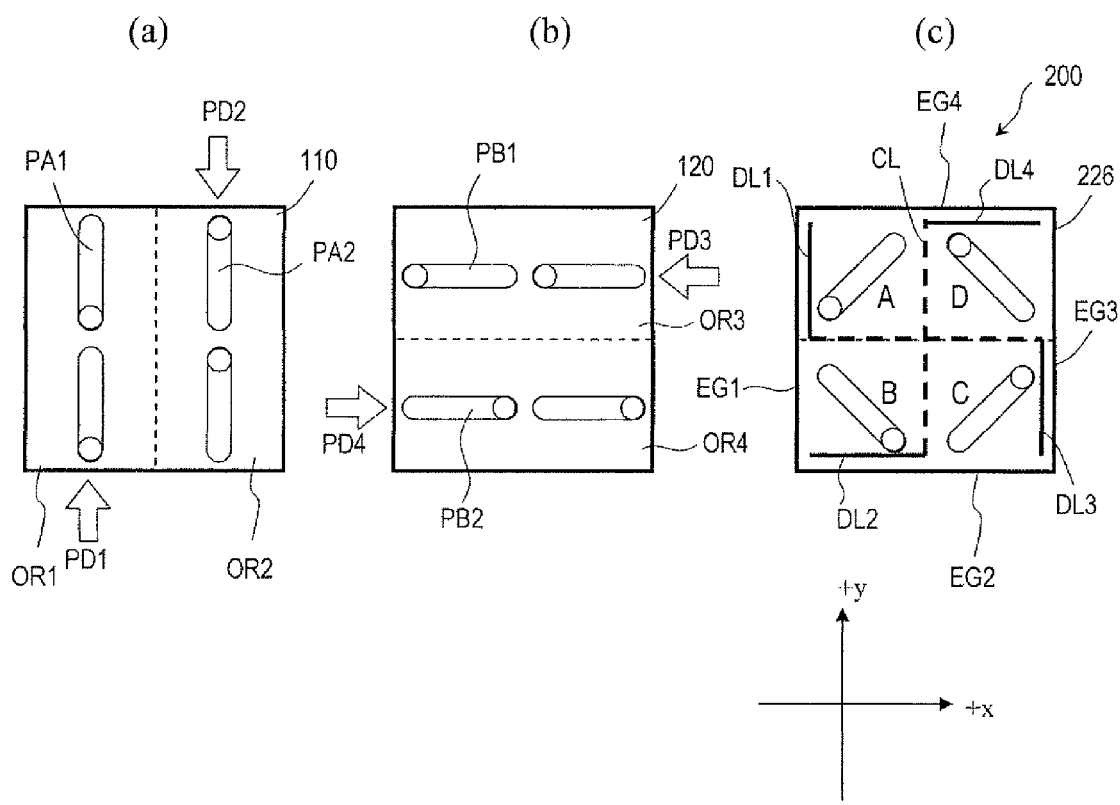
FIG. 5(a) is a schematic diagram of an alignment film of the liquid crystal display device of the present embodiment; (b) is a schematic diagram of the alignment film; and (c) is a schematic diagram showing alignment directions of liquid crystal molecules in the centers of liquid crystal domains.
Figure 6:
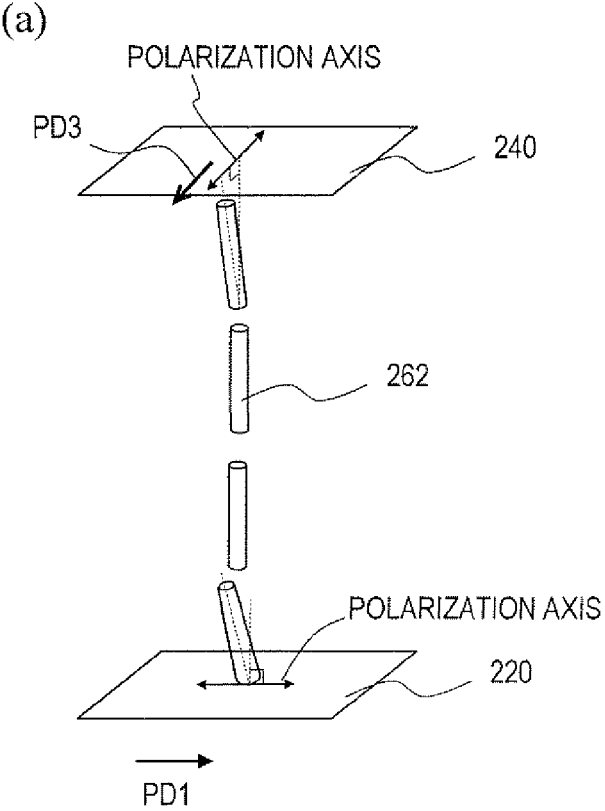
FIG. 6(a) is a schematic diagram showing an alignment state of liquid crystal molecules in a liquid crystal display device of Example 1-1; and (b) is a schematic diagram showing alignment treatment directions for the first and second alignment films as viewed from the viewer's side.
Figure 6:
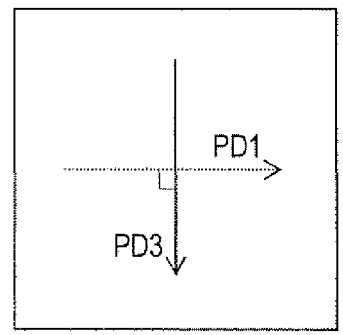

Moreover, the liquid crystal display device 200 may be of the 4D-RTN (4 Domain-Reverse Twisted Nematic) mode. Hereinafter, a liquid crystal display device of the 4D-RTN mode will be described with reference to FIG. 5.

FIG. 5(a) shows pretilt directions PA1 and PA2 of liquid crystal molecules defined on the alignment film 110 of the active matrix substrate 220, and FIG. 5(b) shows pretilt directions PB1 and PB2 of liquid crystal molecules defined on the alignment film 120 of the counter substrate 240. FIG. 5(c) shows alignment directions of liquid crystal molecules in the centers of liquid crystal domains A to D under an applied voltage, and regions (domain lines) DL1 to DL4 appearing dark due to alignment disorder. Note that the domain lines DL1 to DL4 are not so-called disclination lines.

FIG. 5(a) to FIG. 5(c) schematically show alignment directions of liquid crystal molecules as seen from the viewer side. FIG. 5(a) to FIG. 5(c) indicate that the end portions (essentially circular portions) of the cylindrical liquid crystal molecules are tilted toward the viewer.

As shown in FIG. 5(a), the first alignment film 110 includes a first alignment region OR1 and a second alignment region OR2. The liquid crystal molecules regulated by the first alignment region OR1 are tilted in the −y direction from the normal direction of the principal face of the first alignment film 110, whereas the liquid crystal molecules regulated by the second alignment region OR2 of the first alignment film 110 are tilted in the +y direction from the normal direction of the principal face of the first alignment film 110. Moreover, the boundary between the first alignment region OR1 and the second alignment region OR2 extends in the column direction (y direction), and located in the substantial center along the row direction (x direction) of pixels. Thus, first and second alignment regions OR1 and OR2 of different pretilt azimuths are provided on the first alignment film 110.

Moreover, as shown in FIG. 5(b), the second alignment film 120 includes a third alignment region OR3 and a fourth alignment region OR4. The liquid crystal molecules regulated by the third alignment region OR3 are tilted in the +x direction from the normal direction of the principal face of the second alignment film 120, such that the −x direction end portions of these liquid crystal molecules are pointed toward the front face. The liquid crystal molecules regulated by the fourth alignment region OR4 of the second alignment film 120 are tilted in the −x direction from the normal direction of the principal face of the second alignment film 120, such that the +x direction end portions of these liquid crystal molecules are pointed toward the front face. Thus, the second alignment film 120 includes third and fourth alignment regions OR3 and OR4 with different pretilt azimuths.

An alignment treatment direction corresponds to an azimuth angle component obtained by projecting a direction, which extends toward an alignment region along the major axes of the liquid crystal molecules, onto that alignment region. The alignment treatment directions of the first, second, third, and fourth alignment regions are also referred to as first, second, third, and fourth alignment treatment directions.

The first alignment region OR1 of the first alignment film 110 has been subjected to an alignment treatment along a first alignment treatment direction PD1, whereas the second alignment region OR2 has been subjected to an alignment treatment along a second alignment treatment direction PD2 which is different from the first alignment treatment direction PD1. The first alignment treatment direction PD1 is essentially antiparallel to the second alignment treatment direction PD2. Moreover, the third alignment region OR3 of the second alignment film 120 has been subjected to an alignment treatment along a third alignment treatment direction PD3, whereas the fourth alignment region OR4 has been subjected to an alignment treatment along a fourth alignment treatment direction PD4 which is different from the third alignment treatment direction PD3. The third alignment treatment direction PD3 is essentially antiparallel to the fourth alignment treatment direction PD4.

As shown in FIG. 5(c), four liquid crystal domains A, B, C, and D are formed in the liquid crystal layer of a pixel. In the liquid crystal layer 260, a portion interposed between the first alignment region OR1 of the first alignment film 110 and the third alignment region OR3 of the second alignment film 120 defines the liquid crystal domain A; a portion interposed between the first alignment region OR1 of the first alignment film 110 and the fourth alignment region OR4 of the second alignment film 120 defines a liquid crystal domain B; a portion interposed between the second alignment region OR2 of the first alignment film 110 and the fourth alignment region OR4 of the second alignment film 120 defines a liquid crystal domain C; and a portion interposed between the second alignment region OR2 of the first alignment film 110 and the third alignment region OR3 of the second alignment film 120 defines a liquid crystal domain D. Note that the angle constituted by the first or second alignment treatment direction PD1 or PD2 and the third or fourth alignment treatment direction PD3 or PD4 is essentially 90°, and the twist angle in each of the liquid crystal domains A, B, C, and D is essentially 90°.

The alignment direction of a liquid crystal molecule at the center of a liquid crystal domain A to D is an intermediate direction between the pretilt direction for liquid crystal molecules introduced by the first alignment film 110 and the pretilt direction for liquid crystal molecules introduced by the second alignment film 120. In the present specification, the alignment direction of a liquid crystal molecule in the center of a liquid crystal domain is referred to as a reference alignment direction; and within the reference alignment direction, an azimuth angle component in a direction from the rear face toward the front face and along the major axis of the liquid crystal molecule (i.e., an azimuth angle component obtained by projecting the reference alignment direction onto the principal face of the first alignment film 110 or the second alignment film 120) is referred to as a reference alignment azimuth. The reference alignment azimuth characterizes its corresponding liquid crystal domain, and exerts a predominant influence on the viewing angle characteristics of that liquid crystal domain. Now, by relying on the horizontal direction (right-left direction) of the display screen (plane of the figure) as a reference for the azimuthal direction, and defining the left turn as positive (i.e., if the display surface is compared to the face of a clock, counterclockwise is positive, the 3 o'clock direction being an azimuth angle of 0°), the reference alignment directions of the four liquid crystal domains A to D are set to be four directions such that the difference between any two directions is substantially equal to an integer multiple of 90°. Specifically, the reference alignment azimuths of the liquid crystal domains A, B, C, and D are, respectively, 225°, 315°, 45°, and 135°.

As shown in FIG. 5(c), the domain lines DL1 to DL4 are respectively formed in the liquid crystal domains A, B, C, and D. The domain line DL1 is formed in parallel to a portion of an edge EG1 of the pixel electrode 224, whereas the domain line DL2 is formed in parallel to a portion of an edge EG2. Moreover, the domain line DL3 is formed in parallel to a portion of an edge EG3 of the pixel electrode 224, whereas the domain line DL4 is formed in parallel to a portion of an edge EG4. Moreover, a disclination line CL indicated by a broken line is observed in a border region where each of the liquid crystal domains A to D adjoins another liquid crystal domain. The disclination lines CL are dark lines in the aforementioned central portion. The disclination lines CL and the domain lines DL1 to DL4 are continuous, thus resulting in dark lines of a reverse 卍 shape. Although the dark lines herein are in a reverse 卍 shape, the dark lines may be in an 8 shape.

Although the above-described liquid crystal display device is of the 4D-RTN mode, the present invention is not limited thereto. The liquid crystal display device may be of the CPA mode.

Although the above description illustrates that each alignment film includes two alignment layers, the present invention is not limited thereto. Each alignment film may include three or more alignment layers.

Hereinafter, alignment films and liquid crystal display devices of the present Examples will be described.

EXAMPLE 1

EXAMPLE 1-1

Hereinafter, with reference to FIG. 2, FIG. 3, FIG. 4, and FIG. 6, alignment films and a liquid crystal display device of Example 1-1 will be described. The liquid crystal display device of Example 1-1 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing the precursor (polyamic acid) of the second polyimide p2 represented by structural formula (3a') to be dissolved in a solvent, and thereafter further allowing a polyfunctional monomer to be dissolved therein. The precursor of the second polyimide p2 had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied onto the first alignment layer 112 through a nozzle. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224.

Thereafter, obliquely from a 40° direction with respect to the normal direction of a principal face of the first alignment film 110, P-polarized light with a peak wavelength of 330 nm was radiated at 50 mJ/cm², thus performing a photo-alignment treatment. Similarly, the two aforementioned alignment layer materials were applied to form the second alignment film 120 including the first alignment layer 122 and the second alignment layer 124 on the counter electrode 244, and a photo-alignment treatment was performed. An analysis of the first and second alignment films 110 and 120 indicated that the polymerization product po, into which biphenyldimethacrylate had polymerized, existed only in the second alignment layers 114 and 124, and not in the first alignment layers 112 and 122.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy Δ∈ of −3, and a birefringence Δn of 0.085. The liquid crystal molecules 262 had a pretilt angle of 86.8°.

FIG. 6(a) shows an alignment state of the liquid crystal molecules 262 in the liquid crystal display device of Example 1-1. As shown in FIG. 6(b), the active matrix substrate 220 and the counter substrate 240 were attached together so that the angle between the alignment treatment direction PD1 of the first alignment film 110 and the alignment treatment direction PD3 of the second alignment film 120 was 90°, and the liquid crystal molecules 262 had a twist angle of 90°.

Herein, the polarization axis of the polarizer on the active matrix substrate 220 was parallel to the alignment treatment direction of the first alignment film 110, and the polarization axis of the polarizer on the counter substrate 240 was parallel to the alignment treatment direction of the second alignment film 120. In this manner, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.02°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed no image sticking.

EXAMPLE 1-2

Hereinafter, with reference to FIG. 2, FIG. 3, FIG. 4, and FIG. 6, alignment films and a liquid crystal display device of Example 1-2 will be described. The liquid crystal display device of Example 1-2 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing the precursor (polyamic acid) of the second polyimide p2 represented by structural formula (3a') to be dissolved in a solvent, and thereafter further allowing a polyfunctional monomer to be dissolved therein. The precursor of the second polyimide p2 had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied on the first alignment layer 112. The application of the second alignment layer material was performed by a printing technique, ink jet technique, or spin coating technique. As a first heat treatment (pre-bake), one minute of heating was conducted at 90° C. to remove the solvent to a certain extent. Thereafter, obliquely from a 40° direction with respect to the normal direction of a principal face of the first alignment film 110, P-polarized light with a peak wavelength of 330 nm was radiated at 50 mJ/cm², thus performing a photo-alignment treatment. Furthermore, as a second heat treatment (post-bake), 40 minutes of heating was conducted at 150° C. Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224.

Similarly, the two aforementioned alignment layer materials were applied to form the second alignment film 120 including the first alignment layer 122 and the second alignment layer 124 on the counter electrode 244, and a photo-alignment treatment was performed. An analysis of the first and second alignment films 110 and 120 indicated that the polymerization product po, into which biphenyldimethacrylate had polymerized, existed only in the second alignment layers 114 and 124, and not in the first alignment layers 112 and 122.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\epsilon$ of −3, and a birefringence $\Delta n$ of 0.085. The liquid crystal molecules 262 had a pretilt angle of 87.5°.

The active matrix substrate 220 and the counter substrate 240 were attached together so that the angle between the alignment treatment direction PD1 of the first alignment film 110 and the alignment treatment direction PD3 of the second alignment film 120 was 90°, and the liquid crystal molecules 262 had a twist angle of 90°. Herein, the polarization axis of the polarizer of the active matrix substrate 220 was parallel to the alignment treatment direction of the first alignment film 110, and the polarization axis of the polarizer of the counter substrate 240 was parallel to the alignment treatment direction of the second alignment film 120. Thus, a liquid crystal panel was produced.

Next, the resultant liquid crystal panel was subjected to a power-on test of continuously applying voltage of ±10 V for 50 hours at room temperature, and thereafter an amount of change in the tilt angle was measured, which indicated that the amount of change in the pretilt angle was 0.02°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed no image sticking.

COMPARATIVE EXAMPLE 1-1

Hereinafter, alignment films and a liquid crystal display device of Comparative Example 1-1 will be described. The liquid crystal display device of Comparative Example 1-1 also operates in the RTN mode. Herein, the method of forming the active matrix substrate of the liquid crystal display device of Comparative Example 1-1 will be described with reference to FIG. 7.

Figure 7:
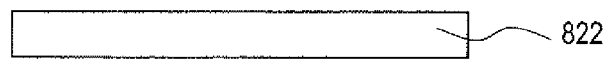
FIG. 7(a) to (d) are schematic diagrams illustrating a method of forming an alignment film in a liquid crystal display device according to Comparative Example.
Figure 7:
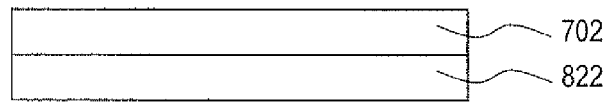
Figure 7:
Figure 7:
Figure 7:
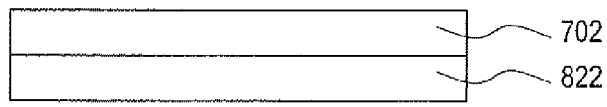
Figure 7:
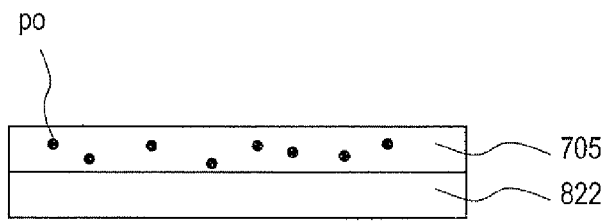

First, on a principal face of a first insulative substrate 822 shown in FIG. 7(a), although not shown in FIG. 7, TFTs and wiring lines connected to the TFTs, and an insulating layer and the like were formed, upon which the pixel electrodes were formed. Similarly, although not shown in FIG. 7, on a principal face of a second insulative substrate, a colored layer having color filters, and an insulating layer, and the like were formed, upon which the counter electrode was formed.

Next, two alignment layer materials were prepared. The first alignment layer material was obtained by allowing the precursor (polyamic acid) of the first polyimide represented by structural formula (2xa') to be dissolved in a solvent. The second alignment layer material was obtained by allowing the precursor (polyamic acid) of the second polyimide represented by structural formula (3a') to be dissolved in a solvent, and thereafter further allowing a polyfunctional monomer to be dissolved therein. The precursor of the second polyimide had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes. The application of the first alignment layer material was performed by a printing technique, ink jet technique, or spin coating technique. As a first heat treatment (pre-bake), one minute of heating was conducted at 90° C. to remove the solvent to a certain extent, thereby forming a first alignment layer 702 shown in FIG. 7(b).

Next, as shown in FIG. 7(c), the second alignment layer material was applied onto the first alignment layer 702 through a nozzle. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, as shown in FIG. 7(d), a mixed layer 705 was formed, such that the first polyimide, the second polyimide into which the polyamic acid had imidized, and the polymerization product into which the polyfunctional monomer had polymerized were mixed in the mixed layer 705. Thus, the first alignment film was formed on the pixel electrodes. Thereafter, obliquely from a 40° direction with respect to the normal direction of a principal face of the first alignment film 110, P-polarized light with a peak wavelength of 330 nm was radiated at 50 mJ/cm², thus performing a photo-alignment treatment.

Similarly, the two aforementioned alignment layer materials were applied to form the second alignment film on the counter electrode, and a photo-alignment treatment was performed. An analysis of the first and second alignment films indicated that each had become a single layer of the mixed first alignment layer material and second alignment layer material, such that the polymerization product into which biphenyldimethacrylate had polymerized was present throughout the entire alignment film.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 μm.

Next, a nematic liquid crystal material having negative dielectric anisotropy was provided, which was introduced between the active matrix substrate and the counter substrate. The liquid crystal material had a dielectric anisotropy Δ∈ of −3, and a birefringence Δn of 0.085. The liquid crystal molecules had a pretilt angle of 88.2°.

The active matrix substrate and the counter substrate were attached together so that the angle between the alignment treatment direction of the first alignment film and the alignment treatment direction of the second alignment film was 90°, and the liquid crystal molecules had, a twist angle of 90°. Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.16°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed image sticking.

In Comparative Example 1-1, since a post-bake was not performed after the formation of the first alignment layer, presumably imidization did not occur and the first alignment layer was dissolved with application of the second alignment layer material, and hence no double-layered alignment film was formed. Moreover, the biphenyldimethacrylate monomer which was contained in the solution of the second alignment layer material also entered into the interior of the first alignment layer upon mixing of the second alignment layer material with the first alignment layer, as a result of which the surface distribution density of the polymerization product was lowered.

COMPARATIVE EXAMPLE 1-2

Hereinafter, alignment films and a liquid crystal display device of Comparative Example 1-2 will be described. FIG. 7 will again be referred to in the description. The liquid crystal display device of Comparative Example 1-2 also operates in the RTN mode.

First, on a principal face of the first insulative substrate 822 shown in FIG. 7(a), although not shown in FIG. 7, TFTs and wiring lines connected to the TFTs, and an insulating layer and the like were formed, upon which the pixel electrodes were formed. Similarly, on a principal face of a second insulative substrate, although not shown in the figures, a colored layer having color filters, and an insulating layer and the like were formed, upon which the counter electrode was formed.

Next, two alignment layer materials were prepared. The first alignment layer material was obtained by allowing the precursor (polyamic acid) of the first polyimide represented by structural formula (2xa') to be dissolved in a solvent. The second alignment layer material was obtained by allowing the precursor (polyamic acid) of the second polyimide represented by structural formula (3a') to be dissolved in a solvent, and thereafter further allowing a polyfunctional monomer to be dissolved therein. The precursor of the second polyimide had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes. The application of the first alignment layer material was performed by a printing technique, ink jet technique, or spin coating technique. As a first heat treatment (pre-bake), one minute of heating was conducted at 90° C. to remove the solvent to a certain extent, thereby forming a first alignment layer 702 shown in FIG. 7(b).

Next, as shown in FIG. 7(c), the second alignment layer material was applied onto the first alignment layer 702 through a nozzle. The application of the second alignment layer material was performed by a printing technique, ink jet technique, or spin coating technique. As a first heat treatment (pre-bake), one minute of heating was conducted at 90° C. to remove the solvent to a certain extent. Thereafter, obliquely from a 40° direction with respect to the normal direction of a principal face of the first alignment film, P-polarized light with a peak wavelength of 330 nm was radiated at 50 mJ/cm$^2$, thus performing a photo-alignment treatment. Furthermore, as a second heat treatment (post-bake), 40 minutes of heating was conducted at 150° C. Through such heat treatments, as shown in FIG. 7(d), a mixed layer 705 was formed, such that the first polyimide, the second polyimide into which the polyamic acid had imidized, and the polymerization product into which the polyfunctional monomer had polymerized were mixed in the mixed layer 705. Thus, the first alignment film was formed.

Similarly, the two aforementioned alignment layer materials were applied to form the second alignment film on the counter electrode, and a photo-alignment treatment was performed. An analysis of the first and second alignment films indicated that each had become a single layer of the mixed first alignment layer material and second alignment layer material, such that the polymerization product into which biphenyldimethacrylate had polymerized was present throughout the entire alignment film.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 µm.

Next, a nematic liquid crystal material having negative dielectric anisotropy was provided, which was introduced between the active matrix substrate and the counter substrate. The liquid crystal material had a dielectric anisotropy $\Delta\epsilon$ of −3, and a birefringence $\Delta n$ of 0.085. The liquid crystal molecules had a pretilt angle of 88.5°.

The active matrix substrate and the counter substrate were attached together so that the angle between the alignment treatment direction of the first alignment film and the alignment treatment direction of the second alignment film was 90°, and the liquid crystal molecules had a twist angle of 90°. Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.16°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed image sticking.

Similarly to Comparative Example 1-1, it is presumable that, since thermal imidization of the first alignment layer did not occur, the first alignment layer was dissolved upon application of the solution of the second alignment layer material, so that no double-layered alignment film was formed. Moreover, the biphenyldimethacrylate monomer which was contained in the solution of the second alignment layer material also entered into the interior of the first alignment layer upon mixing of the second alignment layer material with the first alignment layer, as a result of which the surface distribution density of the polymerization product was lowered.

COMPARATIVE EXAMPLE 1-3

Hereinafter, alignment films and a liquid crystal display device of Comparative Example 1-3 will be described. The liquid crystal display device of Comparative Example 1-3 also operates in the RTN mode.

First, on a principal face of the first insulative substrate, although not shown in the figures, TFTs and wiring lines connected to the TFTs, and an insulating layer and the like were formed, upon which the pixel electrodes were formed. Similarly, on a principal face of a second insulative substrate, although not shown in the figures, a colored layer having color filters, and an insulating layer and the like were formed, upon which the counter electrode was formed.

One alignment layer material was provided herein. The alignment layer material was obtained by allowing the precursor (polyamic acid) of the first polyimide represented by structural formula (2xa') and the precursor (polyamic acid) of the second polyimide represented by structural formula (3a') to be dissolved in a solvent. No polyfunctional monomer was mixed in the alignment layer material.

The alignment layer material was applied on the pixel electrodes. The application of the alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, an alignment film containing polyimide, into which the polyamic acid had imidized, was formed. Thereafter, obliquely from a 40° direction with respect to the normal direction of a principal face of the first alignment film, P-polarized light with a peak wavelength of 330 nm was radiated at 50 mJ/cm$^2$, thus performing a photo-alignment treatment.

Similarly, the aforementioned alignment layer material was applied to form a second alignment film on the counter electrode, and a photo-alignment treatment was performed.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 µm.

Next, biphenyldimethacrylate was mixed in a nematic liquid crystal material having negative dielectric anisotropy, and this was introduced between the active matrix substrate and the counter substrate. The liquid crystal material had a dielectric anisotropy Δ∈ of −3, and a birefringence Δn of 0.085. The liquid crystal molecules had a pretilt angle of 88.5°.

Next, by radiating ultraviolet light with a peak wavelength of 365 nm for 4 hours at an intensity of 15 mW/cm², polymerization of the biphenyldimethacrylate was effected.

The active matrix substrate and the counter substrate were attached together so that the angle between the alignment treatment direction of the first alignment film and the alignment treatment direction of the second alignment film was 90°, and the liquid crystal molecules had a twist angle of 90°. Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.03°. A voltage holding ratio measured after finishing the power-on test was 98.5% or more, indicative that powering had been sufficiently conducted. A voltage holding ratio which was measured after storing this liquid crystal panel in an oven at 70° C. for 1000 h was decreased to 96.0%, and the residual DC voltage was increased to 100 mV. The decrease in the voltage holding ratio and the increase in the residual DC voltage are ascribable to the unpolymerized residual monomer. Moreover, the liquid crystal panel thus produced showed image sticking. This is presumably because the voltage holding ratio is low and the residual DC voltage is large.

COMPARATIVE EXAMPLE 1-4

Hereinafter, alignment films and a liquid crystal display device of Comparative Example 1-4 will be described. The liquid crystal display device of Comparative Example 1-4 also operates in the RTN mode. Comparative Example 1-4 is similar to the above-described Comparative Example 1-3 except that 2,6-naphthyldimethacrylate was mixed in the alignment layer material as a polyfunctional monomer. The resultant liquid crystal panel had a pretilt angle of 88.6°.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.04°. A voltage holding ratio measured after finishing the power-on test was 98.5% or more, indicative that powering had been sufficiently conducted. A voltage holding ratio which was measured after storing this liquid crystal panel in an oven at 70° C. for 1000 h was decreased to 96.0%, and the residual DC voltage was increased to 100 mV. The decrease in the voltage holding ratio and the increase in the residual DC voltage are ascribable to the unpolymerized residual monomer. Moreover, the liquid crystal panel thus produced showed image sticking. This is presumably because the voltage holding ratio is low and the residual DC voltage is large.

COMPARATIVE EXAMPLE 1-5

Hereinafter, alignment films and a liquid crystal display device of Comparative Example 1-5 will be described. The liquid crystal display device of Comparative Example 1-5 also operates in the RTN mode.

First, on a principal face of the first insulative substrate, although not shown in the figures, TFTs and wiring lines connected to the TFTs, and an insulating layer and the like were formed, upon which the pixel electrodes were formed. Similarly, on a principal face a second insulative substrate, although not shown in the figures, a colored layer having color filters, and an insulating layer and the like were formed, upon which the counter electrode was formed.

One alignment layer material was provided herein. The alignment layer material was obtained by allowing the precursor (polyamic acid) of the first polyimide represented by structural formula (2xa') and the precursor (polyamic acid) of the second polyimide represented by structural formula (3a') to be dissolved in a solvent, to which biphenyldimethacrylate was further mixed as a polyfunctional monomer. The concentration of biphenyldimethacrylate on the basis of the alignment layer material was 10 wt %.

The alignment layer material was applied on the pixel electrodes. The application of the alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, an alignment film containing the polyimide into which the polyamic acid had imidized and the polymerization product into which the biphenyldimethacrylate had polymerized was formed.

Thereafter, obliquely from a 40° direction with respect to the normal direction of a principal face of the first alignment film, P-polarized light with a peak wavelength of 330 nm was radiated at 50 mJ/cm², thus performing a photo-alignment treatment.

Similarly, the aforementioned alignment layer material was applied to form a second alignment film on the counter electrode, and a photo-alignment treatment was performed. An analysis of the first and second alignment films indicated that the first alignment layer and the second alignment layer had mixed into a single layer, such that the polymerization product into which the biphenyldimethacrylate had polymerized was present throughout the entire alignment film.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 μm.

Next, biphenyldimethacrylate was mixed in a nematic liquid crystal material having negative dielectric anisotropy, and this was introduced between the active matrix substrate and the counter substrate. The liquid crystal material had a dielectric anisotropy Δ∈ of −3, and a birefringence Δn of 0.085. The liquid crystal molecules had a pretilt angle of 88.4°.

The active matrix substrate and the counter substrate were attached together so that the angle between the alignment treatment direction of the first alignment film and the alignment treatment direction of the second alignment film was 90°, and the liquid crystal molecules had a twist angle of 90°. Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10V for 50 hours at room temperature, and thereafter an amount of change in the tilt angle was measured, which indicated that the amount of change in the pretilt angle was 0.17°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low.

The liquid crystal panel thus produced showed image sticking. This is presumably because the alignment film was not double-layered, so that the polymerization product present on the surface of the alignment film had a low concentration and the pretilt angle varied by 0.1° or more.

EXAMPLE 2

Hereinafter, with reference to FIG. 2, FIG. 3, FIG. 4, and FIG. 6, alignment films and a liquid crystal display device of Example 2 will be described. The liquid crystal display device of Example 2 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing a precursor (polyamic acid) of the second polyimide p2 to be dissolved in a solvent, and thereafter further allowing a polyfunctional monomer to be dissolved therein. The precursor of the second polyimide p2 was a polyamic acid (AL60101 manufactured by JSR Corporation) having a vertical alignment group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied on the first alignment layer 112. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224. Thereafter, an ion beam was radiated obliquely from a 40° direction with respect to the normal direction of a principal face of the first alignment film 110, thereby performing an alignment treatment.

Similarly, the two aforementioned alignment layer materials were applied to form the second alignment film 120 including the first alignment layer 122 and the second alignment layer 124 on the counter electrode 244, and an alignment treatment was performed via ion beam irradiation. An analysis of the first and second alignment films 110 and 120 indicated that the polymerization product po, into which biphenyldimethacrylate had polymerized, existed only in the second alignment layers 114 and 124, and not in the first alignment layers 112 and 122.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta\in$ of −3, and a birefringence $\Delta n$ of 0.085. The liquid crystal molecules 262 had a pretilt angle of 86.0°.

The active matrix substrate 220 and the counter substrate 240 were attached together so that the angle between the alignment treatment direction PD1 of the first alignment film 110 and the alignment treatment direction PD3 of the second alignment film 120 was 90°, and the liquid crystal molecules 262 had a twist angle of 90°. Herein, the polarization axis of the polarizer of the active matrix substrate 220 was parallel to the alignment treatment direction of the first alignment film 110, and the polarization axis of the polarizer of the counter substrate 240 was parallel to the alignment treatment direction of the second alignment film 120. Thus, a liquid crystal panel was produced.

Next, the resultant liquid crystal panel was subjected to a power-on test of continuously applying a voltage of ±10V for 50 hours at room temperature, and thereafter an amount of change in the tilt angle was measured, which indicated that the amount of change in the pretilt angle was 0.03°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed no image sticking.

COMPARATIVE EXAMPLE 2

Hereinafter, alignment films and a liquid crystal display device of Comparative Example 2 will be described. The liquid crystal display device of Comparative Example 2 also operates in the RTN mode.

First, on a principal face of the first insulative substrate, although not shown in the figures, TFTs and wiring lines connected to the TFTs, and an insulating layer and the like were formed, upon which the pixel electrodes were formed. Similarly, on a principal face of a second insulative substrate, although not shown in the figures, a colored layer having color filters, and an insulating layer and the like were formed, upon which the counter electrode was formed.

Next, two alignment layer materials were prepared. The first alignment layer material was obtained by allowing the precursor (polyamic acid) of the first polyimide represented by structural formula (2xa') to be dissolved in a solvent. The second alignment layer material was obtained by allowing a precursor (polyamic acid) of the second polyimide to be dissolved in a solvent, and thereafter further allowing a polyfunctional monomer to be dissolved therein. The precursor of the second polyimide had a vertical alignment group in its side chain (AL60101 manufactured by JSR Corporation). The polyfunctional monomer was biphenyldimethacrylate. The concentration of the polyfunctional monomer on the basis of the second alignment layer material was 10 wt %.

The first alignment layer material was applied on the pixel electrodes. The application of the first alignment layer material was performed by a printing technique, ink jet technique, or spin coating technique. As a first heat treatment (pre-bake), one minute of heating was conducted at 90° C. to remove the solvent to a certain extent, thereby forming the first alignment layer.

Next, the second alignment layer material was applied on the first alignment layer. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer including the second polyimide into which the polyamic acid had imidized and the polymerization product into which the polyfunctional monomer had polymerized was formed. Thus, the first alignment film was formed on the pixel electrodes. Thereafter, an ion beam was radiated obliquely from a 40° direction with respect to the normal direction of a principal face of the first alignment, thereby performing a photo-alignment treatment.

Similarly, the two aforementioned alignment layer materials were applied to form the second alignment film including the first alignment layer and the second alignment layer on the counter electrode, and an alignment treatment with an ion beam was performed. An analysis of the first and second alignment films indicated that the first polyimide and the second polyimide had mixed into a single layer, such that the polymerization product into which the biphenyldimethacrylate had polymerized was present throughout the entire alignment film.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 μm.

Next, a nematic liquid crystal material having negative dielectric anisotropy was provided, which was introduced between the active matrix substrate and the counter substrate. The liquid crystal material had a dielectric anisotropy $\Delta \in$ of −3, and a birefringence $\Delta n$ of 0.085. The liquid crystal molecules had a pretilt angle of 86.2°.

The active matrix substrate and the counter substrate were attached together so that the angle between the alignment treatment direction of the first alignment film and the alignment treatment direction of the second alignment film was 90°, and the liquid crystal molecules had a twist angle of 90°.

Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10V for 50 hours at room temperature, and thereafter an amount of change in the tilt angle was measured, which indicated that the amount of change in the pretilt angle was 0.19°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed image sticking.

In Comparative Example 1-1, as in 1-2, since a post-bake was not performed after the formation of the first alignment layer, presumably imidization did not occur and the first alignment layer was dissolved with application of the second alignment layer material, and hence no double-layered alignment film was formed. Moreover, the biphenyldimethacrylate monomer which was contained in the solution of the second alignment layer material also entered into the interior of the first alignment layer upon mixing of the second alignment layer material with the first alignment layer, as a result of which the surface distribution density of the polymerization product was lowered.

EXAMPLE 3

Hereinafter, with reference to FIG. 2, FIG. 3, FIG. 4, and FIG. 6, alignment films and a liquid crystal display device of Example 3 will be described. The liquid crystal display device of Example 3 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing a precursor (polyamic acid) of the second polyimide p2 to be dissolved in a solvent, and thereafter further allowing a polyfunctional monomer to be dissolved therein. The precursor of the second polyimide p2 was a polyamic acid (AL60101 manufactured by JSR Corporation) having a vertical alignment group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied on the first alignment layer 112. The application of the second alignment layer material was performed by a printing technique, ink technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224. Thereafter, a principal face of the first alignment film 110 was subjected to a rubbing treatment.

Similarly, the two aforementioned alignment layer materials were applied to form the second alignment film 120 including the first alignment layer 122 and the second alignment layer 124 on the counter electrode 244, and a rubbing treatment was performed. An analysis of the first and second alignment films 110 and 120 indicated that the polymerization product po, into which biphenyldimethacrylate had polymerized, existed only in the second alignment layers 114 and 124, and not in the first alignment layers 112 and 122.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 µm.

Next, a nematic liquid crystal material having negative dielectric anisotropy was provided, which was introduced between the active matrix substrate 220 and the counter substrate 240. The liquid crystal material had a dielectric anisotropy $\Delta\epsilon$ of −3, and a birefringence $\Delta n$ of 0.085. The liquid crystal molecules 262 had a pretilt angle of 85.9°.

The active matrix substrate 220 and the counter substrate 240 were attached together so that the angle between the alignment treatment direction PD1 of the first alignment film 110 and the alignment treatment direction PD3 of the second alignment film 120 was 90°, and the liquid crystal molecules 262 had a twist angle of 90°. Herein, the polarization axis of the polarizer of the active matrix substrate 220 was parallel to the alignment treatment direction of the first alignment film 110, and the polarization axis of the polarizer of the counter substrate 240 was parallel to the alignment treatment direction of the second alignment film 120. Thus, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.03°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed no image sticking.

COMPARATIVE EXAMPLE 3

Hereinafter, alignment films and a liquid crystal display device of Comparative Example 3 will be described. The liquid crystal display device of Comparative Example 3 also operates in the RTN mode.

First, on a principal face of the first insulative substrate, although not shown in the figures, TFTs and wiring lines connected to the TFTs, and an insulating layer and the like were formed, upon which the pixel electrodes were formed. Similarly, on a principal face of a second insulative substrate, although not shown in the figures, a colored layer having color filters, and an insulating layer and the like were formed, upon which the counter electrode was formed.

Next, two alignment layer materials were prepared. The first alignment layer material was obtained by allowing the precursor (polyamic acid) of the first polyimide represented by structural formula (2xa') to be dissolved in a solvent. The second alignment layer material was obtained by allowing a precursor (polyamic acid) of the second polyimide to be dissolved in a solvent, and thereafter further allowing a polyfunctional monomer to be dissolved therein. The precursor of the second polyimide had a vertical alignment group in its side chain (AL60101 manufactured by JSR Corporation). The polyfunctional monomer was biphenyldimethacrylate. The concentration of the polyfunctional monomer on the basis of the second alignment layer material was 10 wt %.

The first alignment layer material was applied on the pixel electrodes. The application of the first alignment layer material was performed by a printing technique, ink jet technique, or spin coating technique. As a first heat treatment (pre-bake), one minute of heating was conducted at 90° C. to remove the solvent to a certain extent, thereby forming the first alignment layer.

Next, the second alignment layer material was applied on the first alignment layer. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer including the second polyimide into which the polyamic acid had imidized and the polymerization product into which the polyfunctional monomer had polymerized was formed. Thus, the first alignment film was formed on the pixel electrodes. Thereafter, a principal face of the first alignment film was subjected to a rubbing treatment.

Similarly, the two aforementioned alignment layer materials were applied to form the second alignment film including the first alignment layer and the second alignment layer on the counter electrode, and a rubbing treatment was performed. An analysis of the first and second alignment films indicated that the first polyimide and the second polyimide had mixed into a single layer, such that the polymerization product into which the biphenyldimethacrylate had polymerized was present throughout the entire alignment film.

Next, the active matrix substrate and the counter substrate were attached together so that the first alignment film and the second alignment film opposed each other and that the angle between the alignment treatment direction of the first alignment film and the alignment treatment direction of the second alignment film was 90°, and fixed so that the interspace between the active matrix substrate and the counter substrate was about 4 µm.

Next, a nematic liquid crystal material having negative dielectric anisotropy was provided, which was introduced between the active matrix substrate and the counter substrate. The liquid crystal material had a dielectric anisotropy $\Delta\epsilon$ of −3, and a birefringence $\Delta n$ of 0.085. The liquid crystal molecules had a pretilt angle of 86.0°.

The active matrix substrate and the counter substrate were attached together so that the angle between the alignment treatment direction of the first alignment film and the alignment treatment direction of the second alignment film was 90°, and the liquid crystal molecules had a twist angle of 90°. Herein, the polarization axis of the polarizer of the active matrix substrate was parallel to the alignment treatment direction of the first alignment film, and the polarization axis of the polarizer of the counter substrate was parallel to the alignment treatment direction of the second alignment film. Thus, a liquid crystal panel was produced.

Next, the resultant liquid crystal panel was subjected to a power-on test of continuously applying a voltage of ±10 V for 50 hours at room temperature, and thereafter an amount of change in the tilt angle was measured, which indicated that the amount of change in the pretilt angle was 0.17°. A voltage holding ratio measured after finishing the power-on test was 99.5% or more, indicative that powering had been sufficiently conducted. A voltage holding ratio which was measured after storing this liquid crystal panel in an oven at 70° C. for 1000 h was 99.5% or more. The residual DC voltage was 50 mV or less, which is sufficiently low. The liquid crystal panel thus produced showed image sticking.

In Comparative Example as in Comparative Example 1-2 and Comparative Example 2, since a post-bake was not performed after the formation of the first alignment layer, presumably imidization did not occur and the first alignment layer was dissolved with application of the second alignment layer material, and hence no double-layered alignment film was formed. Moreover, the biphenyldimethacrylate monomer which was contained in the solution of the second alignment layer material also entered into the interior of the first alignment layer upon mixing of the second alignment layer material with the first alignment layer, as a result of which the surface distribution density of the polymerization product was lowered.

EXAMPLE 4

Hereinafter, with reference to FIG. 2, FIG. 3, FIG. 4, and FIG. 8, alignment films and a liquid crystal display device of Example 4 will be described. The liquid crystal display device of Example 4 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing the precursor (polyamic acid) of the second polyimide p2 represented by structural formula (3a') to be dissolved in a solvent, and thereafter further allowing a polyfunctional monomer to be dissolved therein. The precursor of the second polyimide p2 had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied on the first alignment layer 112. The application of the second alignment layer material was performed by printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224.

Thereafter, regions of the first alignment film 110 each corresponding to a half of a pixel were irradiated at 50 mJ/cm² with P-polarized light having a peak wavelength of 330 nm, at an azimuth angle of 0° and obliquely from a 40° direction with respect to the normal direction of a principal face of the first alignment film 110. When the light irradiation was performed, the cinnamate group underwent a dimerization reaction, whereby a dimerization site was formed. Next, regions each corresponding to the other half of a pixel of the first alignment film 110 were irradiated at 50 mJ/cm² with P-polarized light having a peak wavelength of 330 nm, at an azimuth angle of 180° and obliquely from a 40° direction with respect to the normal direction of a principal face of the first alignment film 110. Thus, photo-alignment treatments were performed to form regions with different alignment treatment directions.

Similarly, the two aforementioned alignment layer materials were consecutively applied on the counter electrode 244, and each alignment layer material was heated at 90° C. for one minute so as to remove the solvent to a certain extent, further followed by 40 minutes of heating at 200° C. The first and second polyimides p1 and p2 were formed, and the dimethacrylate polymerized to form the polymerization product po. Thus, the second alignment film 120 was formed on the counter electrode 244. Thereafter, each pixel of the second alignment film 120 was irradiated at 50 mJ/cm² with P-polarized light having a peak wavelength of 330 nm, obliquely from a 40° direction with respect to the normal direction of a principal face of the second alignment film 120. A photo-alignment treatment was thus performed. An analysis of the first and second alignment films 110 and 120 indicated that the polymerization product po, into which biphenyldimethacrylate had polymerized, existed only in the second alignment layers 114 and 124, and not in the first alignment layers 112 and 122.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta \in$ of −3, and a birefringence $\Delta n$ of 0.085.

Figure 8:
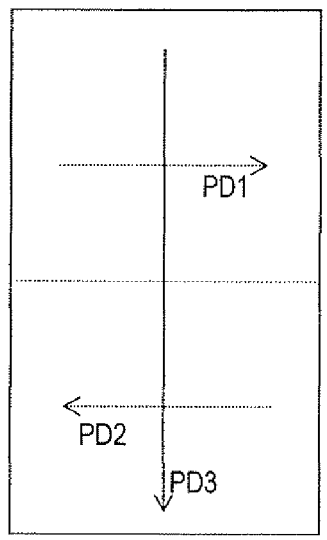
FIG. 8 A schematic diagram showing alignment treatment directions for the first and second alignment films as viewed from the viewer's side, in a liquid crystal display device of Example 4.

FIG. 8 shows the alignment treatment directions of the first and second alignment films 110 and 120 of Example 4. As described earlier, the active matrix substrate 220 and the counter substrate 240 were attached together so that the angles between the alignment treatment directions PD1 and PD2 of the first alignment film 110 and the alignment treatment direction PD3 of the second alignment film 120 were 90°, and the liquid crystal molecules 262 had a twist angle of 90°. A voltage holding ratio measured after finishing the power-on test was 99.5% or more, indicative that powering had been sufficiently conducted. The liquid crystal panel thus produced showed no image sticking.

EXAMPLE 5

Hereinafter, with reference to FIG. 2, FIG. 3, FIG. 4, and FIG. 9, alignment films and a liquid crystal display device of Example 5 will be described. The liquid crystal display device of Example 5 also operates in the RTN mode.

First, on a principal face of the first insulative substrate 222, although not shown in the figures, TFTs and wiring lines connected to the TFTs, and an insulating layer and the like were formed, upon which the pixel electrodes 224 were formed. Similarly, on a principal face of the second insulative substrate 242, although not shown in the figures, a colored layer having color filters, and an insulating layer and the like were formed, upon which the counter electrode 244 was formed.

Next, two alignment layer materials were prepared. The first alignment layer material was obtained by allowing the precursor (polyamic acid) of the first polyimide p1 represented by structural formula (2xa') to be dissolved in a solvent. The second alignment layer material was obtained by allowing the precursor (polyamic acid) of the second polyimide p2 represented by structural formula (3a') to be dissolved in a solvent, and thereafter further allowing a polyfunctional monomer to be dissolved therein. The precursor of the second polyimide p2 had a cinnamate group in its side chain. The polyfunctional monomer was biphenyldimethacrylate. The concentration of the polyfunctional monomer on the basis of the second alignment layer material was 10 wt %.

The first alignment layer material was applied on the pixel electrodes 224. The application of the first alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the polyamic acid was imidized, whereby the first alignment layer 112 containing the first polyimide p1 was formed.

Next, the second alignment layer material was applied on the first alignment layer 112. The application of the second alignment layer material was performed by a printing technique, ink jet technique, or spin coating technique. As a first heat treatment (pre-bake), one minute of heating was conducted at 90° C. to remove the solvent to a certain extent; and furthermore, 40 minutes of heating was conducted at 200° C. as a second heat treatment (post-bake). Through such heat treatments, the second alignment layer 114 containing the second polyimide p2, into which the polyamic acid had imidized, and the polymerization product po, into which the polyfunctional monomer had polymerized, was formed. In this manner, the first alignment film 110 was formed on the pixel electrodes 224.

Thereafter, regions of the first alignment film 110 each corresponding to a half of a pixel were irradiated at 50 mJ/cm$^4$ with P-polarized light having a peak wavelength of 330 nm, at an azimuth angle of 0° and obliquely from a 40° direction with respect to the normal direction of a principal face of the first alignment film 110. When the light irradiation was performed, the cinnamate group underwent a dimerization reaction, whereby a dimerization site was formed. Next, regions each corresponding to the other half of a pixel of the first alignment film 110 were irradiated at 50 mJ/cm$^2$ with P-polarized light having a peak wavelength of 330 nm, at an azimuth angle of 180° and obliquely from a 40° direction with respect to the normal direction of a principal face of the first alignment film 110. Thus, photo-alignment treatments were performed to form regions with different alignment treatment directions.

Similarly to the first alignment film 110, the aforementioned first alignment layer material was applied on the counter electrode 244, and heated at 90° C. for one minute so as to remove the solvent to a certain extent. After further heating at 200° C. for 40 minutes, the second alignment layer material was further applied, and similarly heated at 90° C. for one minute so as to remove the solvent to a certain extent, further followed by 40 minutes of heating at 200° C. As a result, the polyamic acid was imidized, whereby the first alignment layer 122 containing the first polyimide p1 and the second alignment layer 124 including the second polyimide p2 were formed. Thus, the second alignment film 120 was formed on the counter electrode 244.

Thereafter, regions of the second alignment film 120 each corresponding to a half of a pixel were irradiated at 50 mJ/cm$^2$ with P-polarized light having a peak wavelength of 330 nm, at an azimuth angle of 90° and obliquely from a 40° direction with respect to the normal direction of a principal face of the second alignment film 120. When the light irradiation was performed, the cinnamate group underwent a dimerization reaction, whereby a dimerization site was formed. Next, regions each corresponding to the other half of a pixel of the second alignment film 120 were irradiated at 50 mJ/cm$^2$ with P-polarized light having a peak wavelength of 330 nm, at an azimuth angle of 270° and obliquely from a 40° direction with respect to the normal direction of a principal face of the second alignment film 120. Thus, photo-alignment treatments were performed to form regions with different alignment treatment directions. An analysis of the first and second alignment films 110 and 120 indicated that the dimethacrylate had polymerized, such that the polymerization product po existed also at the alignment film surface.

Next, the active matrix substrate 220 and the counter substrate 240 were attached together so that the first alignment film 110 and the second alignment film 120 opposed each other and that the angle between the alignment treatment direction of the first alignment film and the alignment treatment direction of the second alignment film was 90°, and fixed so that the interspace between the active matrix substrate 220 and the counter substrate 240 was about 4 μm.

Next, a nematic liquid crystal material having negative dielectric anisotropy was provided, which was introduced between the active matrix substrate 220 and the counter substrate 240. The liquid crystal material had a dielectric anisotropy $\Delta \in$ of −3, and a birefringence $\Delta n$ of 0.085.

Figure 9:
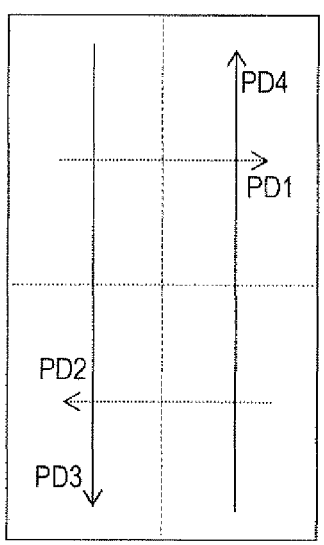
FIG. 9 A schematic diagram showing alignment treatment directions for the first and second alignment films as viewed from the viewer's side, in a liquid crystal display device of Example 5.

FIG. 9 shows the alignment treatment directions of the first and second alignment films 110 and 120 of Example 5. As described earlier, the active matrix substrate 220 and the counter substrate 240 were attached together so that the angles between the alignment treatment directions PD1 and PD2 of the first alignment film 110 and the alignment treatment directions PD3 and PD4 of the second alignment film 120 were 90°, and the liquid crystal molecules 262 had a twist angle of 90°. A voltage holding ratio measured after finishing the power-on test was 99.5% or more, indicative that powering had been sufficiently conducted. The liquid crystal panel thus produced showed no image sticking.

For reference sake, the entire disclosure of Japanese Patent Application No. 2008-303231, on which the present application claims priority, is incorporated herein by reference.

Industrial Applicability

An alignment film according to the present invention is able to suppress image sticking caused by changes in the pretilt angle. Moreover, a liquid crystal display device according to the present invention can be easily produced. For example, there is no need to perform polymerization after attaching an active matrix substrate and a counter substrate together, thus providing an increased degree of freedom in terms of production.

REFERENCE SIGNS LIST

100 alignment film
p1 first polyimide
p2 second polyimide
po polymerization product
102 first alignment layer
104 second alignment layer
110 first alignment film
112 first alignment layer
114 second alignment layer
120 second alignment film
122 first alignment layer
124 second alignment layer
200 liquid crystal display device
220 active matrix substrate
222 first insulative substrate
224 pixel electrode
240 counter substrate
242 second insulative substrate
244 counter electrode
260 liquid crystal layer
262 liquid crystal molecules
300 liquid crystal panel

The invention claimed is:

1. An alignment film and a liquid crystal layer aligned by the alignment film, the alignment film comprising:
a first alignment layer containing a first polyimide; and
a second alignment layer containing a second polyimide different from the first polyimide and a polymerization product resulting from polymerization of a polyfunctional monomer, a first side of the second alignment layer substantially covering and contacting an entire surface of the first alignment layer, the first alignment layer providing the second alignment layer with alignment regulating forces from the first side, the second alignment layer contacting and providing the liquid crystal layer with alignment regulating forces from a second side, wherein the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

2. The alignment film and the liquid layer of claim 1, wherein the polyfunctional monomer contains at least one monomer from among a dimethacrylate monomer, a diacrylate monomer, a dimethacrylamide monomer, and a diacrylamide monomer.

3. The alignment film and the liquid crystal layer of claim 1, wherein, in the polyfunctional monomer, P1 and P2 are acrylate groups; Z1 is a single bond; and n is 0 or 1.

4. The alignment film and the liquid crystal layer of claim 1, wherein, in the polyfunctional monomer, P1 and P2 are methacrylate groups; Z1 is a single bond; and n is 0 or 1.

5. The alignment film and the liquid crystal layer of claim 1, wherein, in the polyfunctional monomer, P1 and P2 are acrylamide groups; Z1 is a single bond; and n is 0 or 1.

6. The alignment film and the liquid crystal layer of claim 1, wherein, in the polyfunctional monomer, P1 and P2 are methacrylamide groups; Z1 is a single bond; and n is 0 or 1.

7. The alignment film and the liquid crystal layer of claim 1, wherein as side chain of a precursor of the first polyimide does not have any vertical alignment groups.

8. The alignment film and the liquid crystal layer of claim 7, wherein the first polyimide is represented by general formula (2x),

[Formula 1]

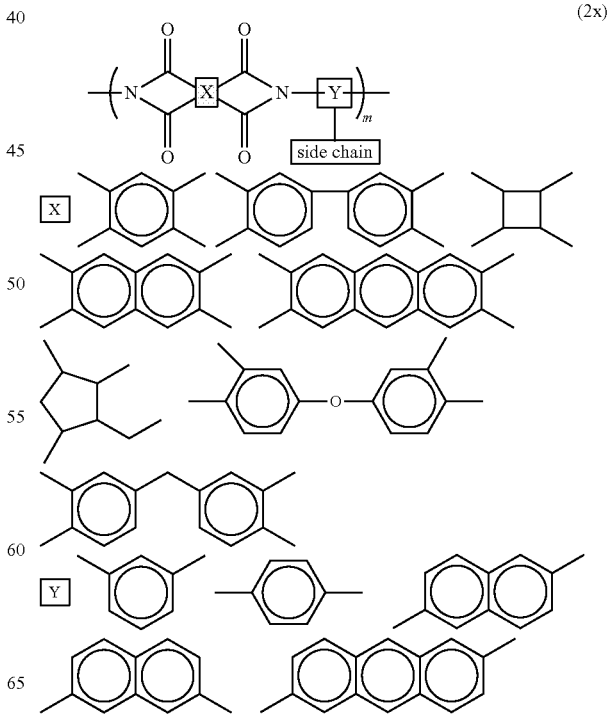

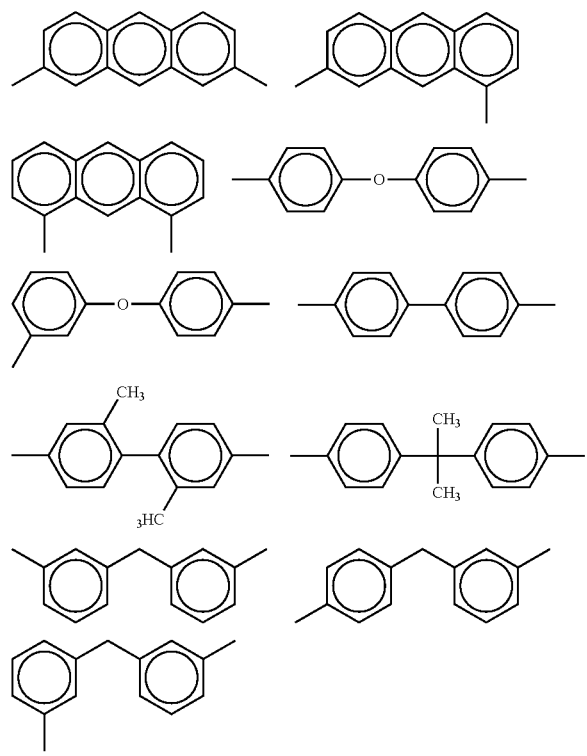
9. The alignment film and the liquid crystal layer of claim 1, wherein a side chain of a precursor of the first polyimide has a vertical alignment group.
10. The alignment film and the liquid crystal layer of claim 9, wherein, the first polyimide is represented by general formula (2y),
[Formula 2]
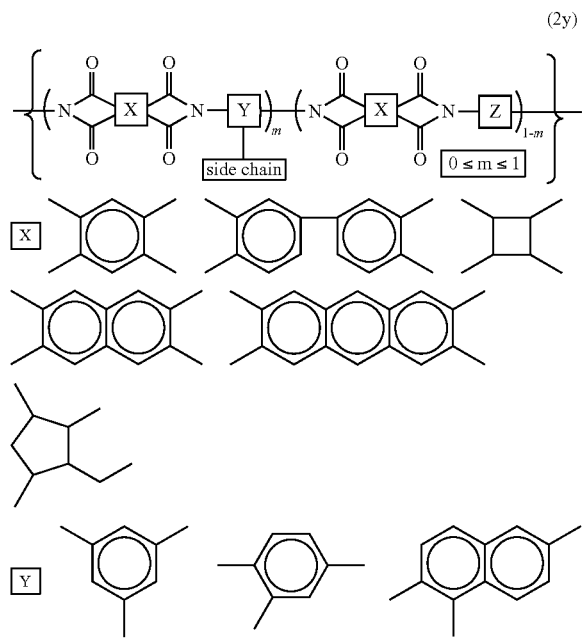
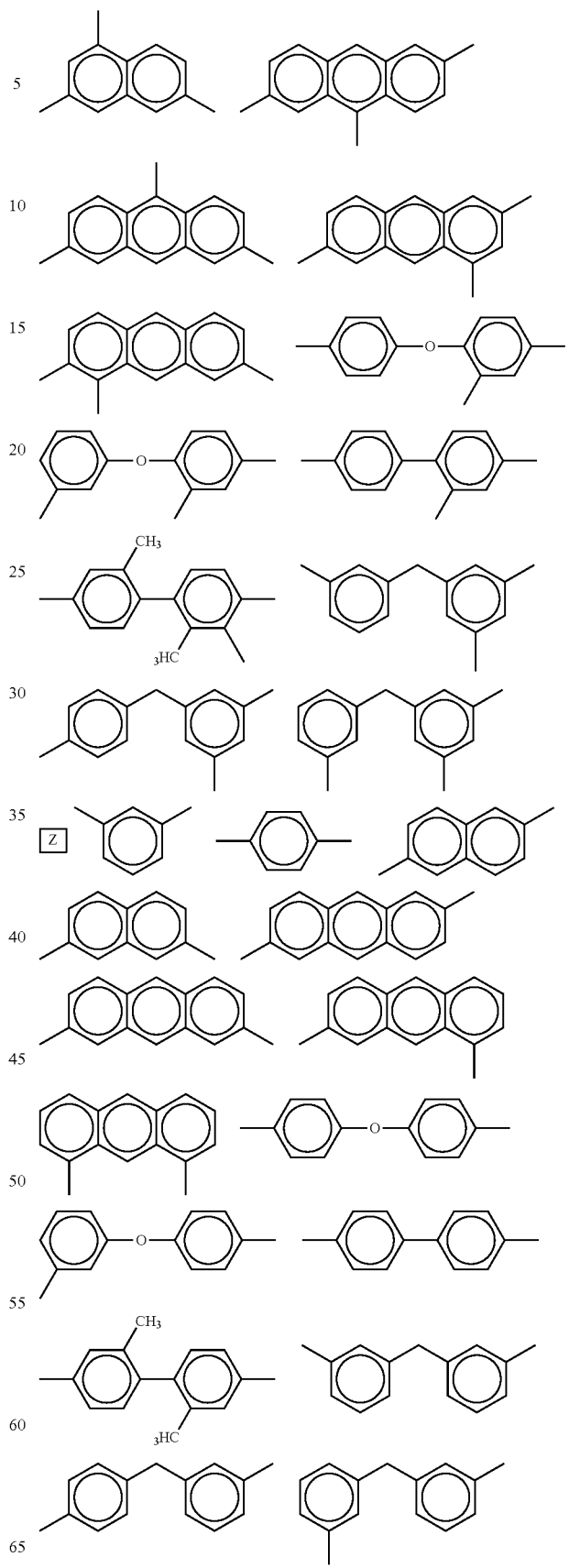

-continued
side chain
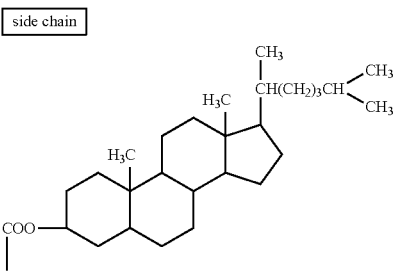
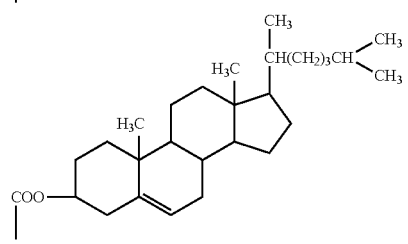
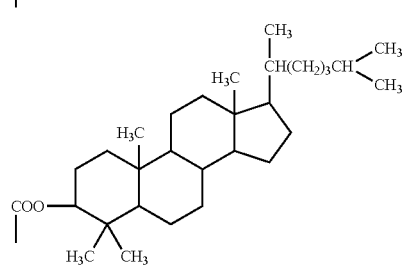
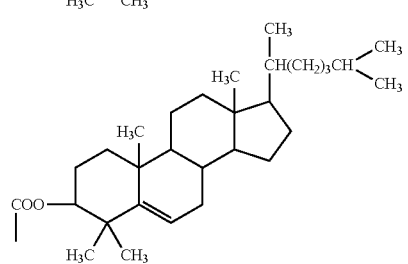
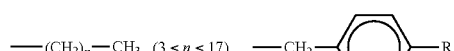
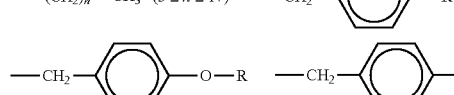
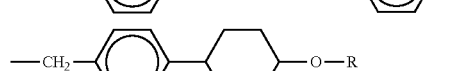
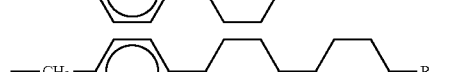
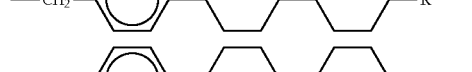
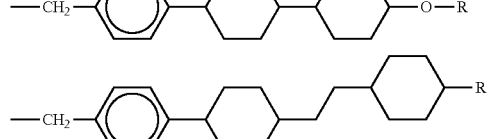
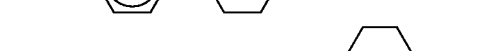
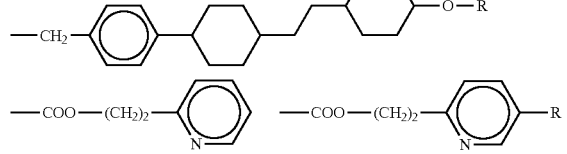
-continued
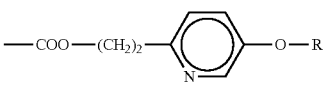
where R is a saturated alkyl group or an unsaturated alkyl group having 3 to 18 carbons.
11. The alignment film and the liquid crystal layer of claim 1, wherein the second polyimide is represented by general formula (3),
[Formula 3]
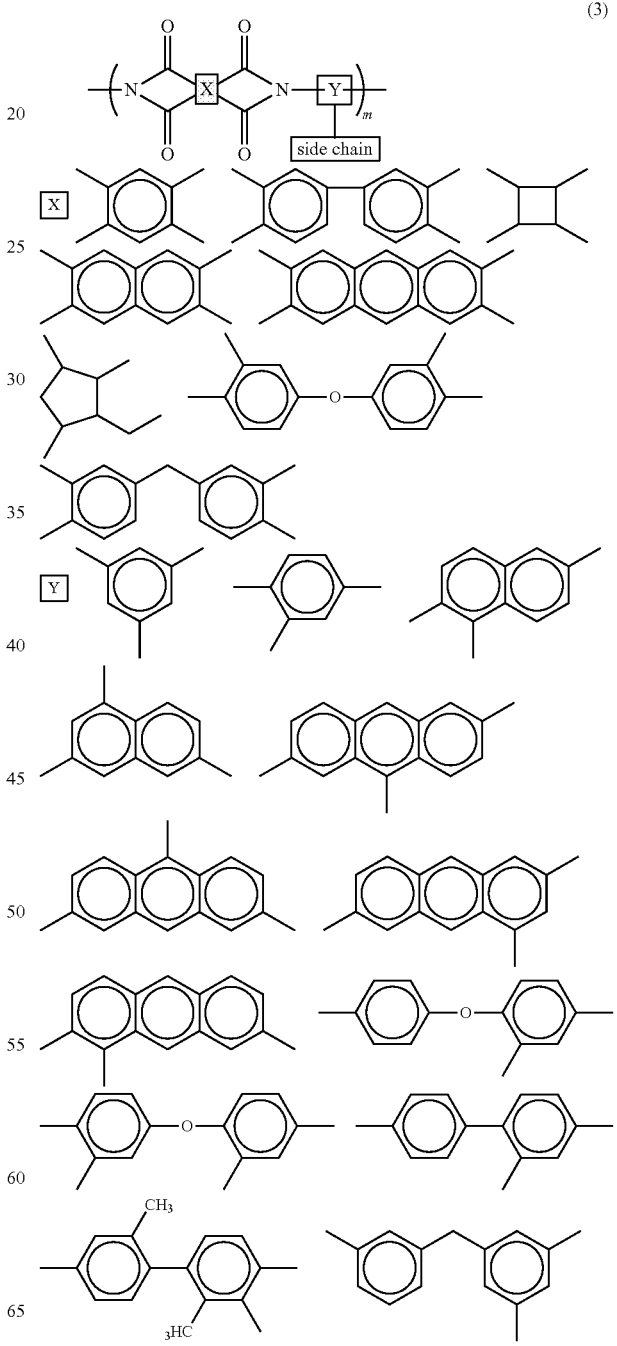

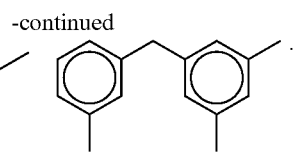

12. The alignment film and the liquid crystal layer of claim 1, wherein,
the second polyimide has a side chain represented by general formula (4),

[Formula 4]

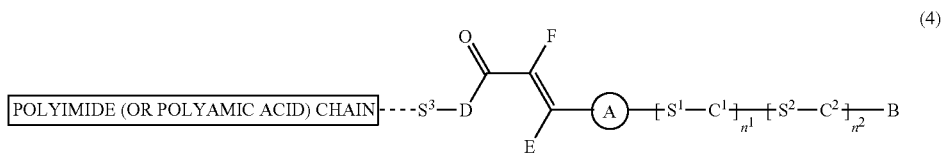

(4)

where
- A represents pyrimidine-2,5-diyl, pyridine-2,5-diyl, 2,5-thiophenylene, 2,5-furanylene, 1,4- or 2,6-naphthylene, or phenylene, optionally substituted by a group selected from fluorine, chlorine, and cyano, or by a $C_{1-18}$ cyclic, linear, or branched alkyl residue (which is optionally substituted by one cyano group or one or more halogen atoms, where one or more non-adjacent —$CH_2$— groups of the alkyl are optionally replaced by a group Q);
- B is a linear or branched alkyl residue which is unsubstituted, mono-substituted by cyano or halogen, or poly-substituted by halogen, having 3 to 18 carbon atoms (where one or more non-adjacent $CH_2$ groups may independently be replaced by a group Q);
- $C^1$ and $C^2$ each independently of the other represent an aromatic or alicyclic group (which is unsubstituted or substituted by fluorine, chlorine, cyano, or by a cyclic, linear, or branched alkyl residue (which is unsubstituted, mono-substituted by cyano or halogen, or poly-substituted by halogen, having 1 to 18 carbon atoms and where one or more non-adjacent $CH_2$ groups may independently be replaced by a group Q));
- D represents an oxygen atom or —$NR^1$— (where $R^1$ represents a hydrogen atom or lower alkyl);
- $S^1$ and $S^2$ each independently of the other represent a single covalent bond or a spacer unit;
- $S^3$ represents a spacer unit;
- Q represents a group selected from —O—, —CO—, —CO—O—, —O—CO—, —Si($CH_3$)$_2$—O—Si($CH_3$)$_2$—, —$NR^1$—, —$NR^1$—CO—, —CO—$NR^1$—, —$NR^1$—CO—O—, —O—CO—$NR^1$—, —$NR^1$—CO—$NR^1$—, —CH═CH—, —C≡C—, and —O—CO—O— (where $R^1$ represents a hydrogen atom or lower alkyl); and
- E and F each independently of the other represent hydrogen, fluorine, chlorine, cyano, alkyl optionally substituted by fluorine having carbon atoms 1 to 12 (where optionally one or more non-adjacent $CH_2$ groups are replaced by —O—, —CO—O—, —O—CO— and/or —CH═CH—).

13. The alignment film and the liquid crystal layer of claim 1, wherein the second polyimide has a fluorine group.

14. The alignment film and the liquid crystal layer of claim 1, wherein the second polyimide has a photoreactive functional group.

15. The alignment film and the liquid crystal layer of claim 14, wherein the photoreactive functional group is one selected from among a cinnamate group, a chalcone group, a tolan group, a coumarin group, and an azobenzene group.

16. The alignment film and the liquid crystal layer of claim 1, wherein a side chain of the second polyimide has a vertical alignment group.

17. A liquid crystal display device comprising:
an active matrix substrate having a pixel electrode;
a counter substrate having a counter electrode; and
a vertical-alignment type liquid crystal layer provided between the active matrix substrate and the counter substrate, wherein,
at least one of the active matrix substrate and the counter substrate further includes an alignment film provided on the liquid crystal layer side;
the alignment film includes
a first alignment layer containing a first polyimide, and
a second alignment layer containing a second polyimide different from the first polyimide and a polymerization product resulting from polymerization of a polyfunctional monomer; a first side of the second alignment layer substantially covering and contacting an entire surface of the first alignment layer, the first alignment layer providing the second alignment layer with alignment regulating forces from the first side, the second alignment layer contacting and providing the liquid crystal layer with alignment regulating forces from a second side; and
the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

18. The liquid crystal display device of claim 17, wherein the alignment film regulates liquid crystal molecules in the liquid crystal layer so that the liquid crystal molecules are inclined with respect to a normal direction of a principal face of the alignment film in the absence of an applied voltage.

19. The liquid crystal display device of claim 17, wherein, the liquid crystal display device has a plurality of pixels; and
in each of the plurality of pixels, the liquid crystal layer has a plurality of liquid crystal domains having respectively different reference alignment azimuths.

20. The liquid crystal display device of claim 17, wherein the plurality of liquid crystal domains are four liquid crystal domains.

21. A method of forming an alignment film and a liquid crystal layer aligned by the alignment film, comprising the steps of:

forming a first alignment layer containing a first polyimide;

forming a second alignment layer containing a second polyimide different from first polyimide and a polymerization product resulting from a polymerization of a polyfunctional monomer;

forming the alignment film and the aligned liquid crystal layer, wherein a first side of the second alignment layer substantially covers and contacts an entire surface of the first alignment layer, the first alignment layer providing the second alignment layer with alignment regulating forces from the first side, the second alignment layer contacting and providing the liquid crystal layer with alignment regulating forces from a second side, whereby in the step of providing the second alignment layer, the polyfunctional monomer is represented by general formula (1) P1-A1-(Z1-A2)n-P2 (in general formula (1), P1 and P2 each independently of the other are an acrylate, methacrylate, acrylamide, methacrylamide, vinyl, vinyloxy, or epoxy group; A1 and A2 each independently of the other represent a 1,4-phenylene, 1,4-cyclohexane, 2,5-thiophene, or naphthalene-2,6-diyl group; Z1 is a —COO— group, a —OCO— group, a —O— group, a —CONH— group or a single bond, where n is 0, 1, or 2).

22. The method of forming an alignment film and a liquid crystal layer of claim 21, wherein the step of forming the first alignment layer comprises:

a step of providing a first alignment layer material containing a precursor of the first polyimide;

a step of applying the first alignment layer material; and a step of imidizing the precursor of the first polyimide to form the first polyimide.

23. The method of forming an alignment film and a liquid crystal layer of claim 22, wherein the step of forming the first polyimide comprises, after applying the first alignment layer material, a step of conducting a pre-bake and thereafter conducting a post-bake at a higher temperature than in the pre-bake.

24. The method of forming an alignment film of claim 21, wherein the step of forming the second alignment layer comprises:

a step of providing a second alignment layer material containing a precursor of the second polyimide and a polyfunctional monomer;

a step of applying the second alignment layer material on the first alignment layer; and a step of forming the second polyimide resulting from imidization of the precursor of the second polyimide and forming the polymerization product resulting from polymerization of the polyfunctional monomer.

25. The method of forming an alignment film and a liquid crystal layer of claim 24, wherein in the step of providing the second alignment layer material, a concentration of the polyfunctional monomer on the basis of the second alignment layer material is no less than 2 wt % and no more than 20 wt %.

* * * * *